United States Patent
Kumar et al.

(10) Patent No.: US 11,729,697 B2
(45) Date of Patent: Aug. 15, 2023

(54) INTEGRATED ACCESS AND BACKHAUL DATA COLLECTION

(71) Applicant: QUALCOMM Incorporated, San Diego, CA (US)

(72) Inventors: Rajeev Kumar, San Diego, CA (US); Karl Georg Hampel, Hoboken, NJ (US); Gavin Bernard Horn, La Jolla, CA (US); Xipeng Zhu, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/443,270

(22) Filed: Jul. 23, 2021

(65) Prior Publication Data
US 2023/0027233 A1    Jan. 26, 2023

(51) Int. Cl.
*H04W 40/36* (2009.01)
*H04W 36/30* (2009.01)
*H04W 74/02* (2009.01)
*H04W 74/08* (2009.01)

(52) U.S. Cl.
CPC ......... *H04W 40/36* (2013.01); *H04W 36/305* (2018.08); *H04W 74/02* (2013.01); *H04W 74/0816* (2013.01); *H04W 74/0841* (2013.01)

(58) Field of Classification Search
CPC ... H04W 40/36; H04W 36/305; H04W 74/02; H04W 74/0816; H04W 74/0841
See application file for complete search history.

(56) References Cited

U.S. PATENT DOCUMENTS

| | | | |
|---|---|---|---|
| 2021/0105698 A1* | 4/2021 | Jactat | H04W 40/12 |
| 2021/0119920 A1 | 4/2021 | Tesanovic | |
| 2021/0195675 A1 | 6/2021 | Park et al. | |

(Continued)

FOREIGN PATENT DOCUMENTS

| | | | |
|---|---|---|---|
| EP | 4057680 A1 | 9/2022 | |
| GB | 2591125 A * | 7/2021 | H04W 24/10 |

(Continued)

OTHER PUBLICATIONS

Partial International Search Report—PCT/US2022/073221—ISA/EPO—dated Sep. 23, 2022.

(Continued)

*Primary Examiner* — Robert C Scheibel
(74) *Attorney, Agent, or Firm* — Harrity & Harrity, LLP

(57) ABSTRACT

Various aspects of the present disclosure generally relate to wireless communication. In some aspects, an apparatus of a central or management entity of an integrated access and backhaul (IAB) network may receive a report indicating one or more of a failure associated with a communication link associated with an IAB node included in the IAB network or a quality of service (QoS) associated with the communication link. The apparatus may modify a topography of the IAB network or routing within the IAB network when the report indicates the failure associated with the communication link. The apparatus may verify a QoS associated with the IAB network when the report indicates the QoS associated with the communication link. Numerous other aspects are described.

44 Claims, 13 Drawing Sheets

(56) References Cited

U.S. PATENT DOCUMENTS

| | | | |
|---|---|---|---|
| 2021/0315043 A1* | 10/2021 | Luo | H04W 36/305 |
| 2021/0377930 A1* | 12/2021 | Liu | H04W 72/0406 |
| 2022/0007212 A1* | 1/2022 | Hwang | H04W 76/38 |
| 2022/0182917 A1* | 6/2022 | Muhammad | H04L 45/42 |
| 2022/0201767 A1* | 6/2022 | Wei | H04W 16/10 |
| 2022/0255689 A1* | 8/2022 | Wen | H04L 5/0032 |

FOREIGN PATENT DOCUMENTS

| | | | |
|---|---|---|---|
| GB | 2597793 A * | 2/2022 | H04W 24/02 |
| WO | 2020167186 A1 | 8/2020 | |
| WO | 2021088988 A1 | 5/2021 | |

OTHER PUBLICATIONS

International Search Report and Written Opinion—PCT/US2022/073221—ISA/EPO—dated Nov. 16, 2022.

* cited by examiner

INTEGRATED ACCESS AND BACKHAUL DATA COLLECTION

FIELD OF THE DISCLOSURE

Aspects of the present disclosure generally relate to wireless communication and to techniques and apparatuses for integrated access and backhaul (IAB) data collection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a central or management entity of an integrated access and backhaul (IAB) network. The method may include receiving a report indicating one or more of a failure associated with a communication link associated with an IAB node included in the IAB network or a quality of service (QoS) associated with the communication link. The method may include modifying a topography of the IAB network or routing within the IAB network when the report indicates the failure associated with the communication link. The method may include verifying a QoS associated with the communication link when the report indicates the QoS associated with the communication link.

Some aspects described herein relate to a method of wireless communication performed by an apparatus of a central or management entity of an IAB network. The method may include receiving a report indicating a radio link quality between an IAB distributed unit (DU) and an IAB mobile terminal (MT) associated with an IAB node. The method may include causing, based on the radio link quality between the IAB DU and the IAB MT, the IAB node to transition from an active state to an inactive state or the IAB node to transition from the inactive state to the active state based at least in part on the radio link quality.

Some aspects described herein relate to a method of wireless communication performed by an apparatus of a central or management entity of an IAB network. The method may include receiving a report indicating a radio link quality between an IAB DU and an IAB MT associated with an IAB node. The method may include modifying, based on the radio link quality between the IAB DU and the IAB MT, a routing of data through the IAB network.

Some aspects described herein relate to a method of wireless communication performed by an apparatus of a central or management entity of an IAB network. The method may include receiving a report indicating a radio link quality between an IAB DU and an IAB MT associated with an IAB node. The method may include optimizing a coverage of the IAB network based at least in part on the radio link quality.

Some aspects described herein relate to an apparatus of a central or management entity of an IAB network. The apparatus may include a memory and one or more processors coupled to the memory. The one or more processors may be configured to receive a report indicating one or more of a failure associated with a communication link associated with an IAB node included in the IAB network or a QoS associated with the communication link. The one or more processors may be configured to modify a topography of the IAB network or routing within the IAB network when the report indicates the failure associated with the communication link. The one or more processors may be configured to verify a QoS associated with the communication link when the report indicates the QoS associated with the communication link.

Some aspects described herein relate to an apparatus of a central or management entity of an IAB network. The apparatus may include a memory and one or more processors coupled to the memory. The one or more processors may be configured to receive a report indicating a radio link quality between an IAB DU and an IAB MT associated with an IAB node. The one or more processors may be configured to cause, based on the radio link quality between the IAB DU and the IAB MT, the IAB node to transition from an active state to an inactive state or the IAB node to transition from the inactive state to the active state based at least in part on the radio link quality.

Some aspects described herein relate to an apparatus of a central or management entity of an IAB network. The apparatus may include a memory and one or more processors coupled to the memory. The one or more processors may be configured to receive a report indicating a radio link quality between an IAB DU and an IAB MT associated with an IAB node. The one or more processors may be configured to modify, based on the radio link quality between the IAB DU and the IAB MT, a routing of data through the IAB network.

Some aspects described herein relate to an apparatus of a central or management entity of an IAB network. The apparatus may include a memory and one or more processors coupled to the memory. The one or more processors may be configured to receive a report indicating a radio link quality between an IAB DU and an IAB MT associated with an IAB node. The one or more processors may be configured to optimize a coverage of the IAB network based at least in part on the radio link quality.

Some aspects described herein relate to a non-transitory computer-readable medium that stores a set of instructions for wireless communication by a central or management entity of an IAB network. The set of instructions, when executed by one or more processors of the central or management entity, may cause the central or management entity to receive a report indicating one or more of a failure associated with a communication link associated with an IAB node included in the IAB network or a QoS associated with the communication link. The set of instructions, when executed by one or more processors of the IAB, may cause the IAB to modify a topography of the IAB network or routing within the IAB network when the report indicates the failure associated with the communication link. The set of instructions, when executed by one or more processors of the IAB, may cause the IAB to verify a QoS associated with the communication link when the report indicates the QoS associated with the communication link.

Some aspects described herein relate to a non-transitory computer-readable medium that stores a set of instructions for wireless communication by a central or management entity of an IAB network. The set of instructions, when executed by one or more processors of the central or management entity, may cause the central or management entity to receive a report indicating a radio link quality between an IAB DU and an IAB MT associated with an IAB node. The set of instructions, when executed by one or more processors of the IAB, may cause the IAB to cause, based on the radio link quality between the IAB DU and the IAB MT, the IAB node to transition from an active state to an inactive state or the IAB node to transition from the inactive state to the active state based at least in part on the radio link quality.

Some aspects described herein relate to a non-transitory computer-readable medium that stores a set of instructions for wireless communication by a central or management entity of an IAB network. The set of instructions, when executed by one or more processors of the central or management entity, may cause the central or management entity to receive a report indicating a radio link quality between an IAB DU and an IAB MT associated with an IAB node. The set of instructions, when executed by one or more processors of the IAB, may cause the IAB to modify, based on the radio link quality between the IAB DU and the IAB MT, a routing of data through the IAB network.

Some aspects described herein relate to a non-transitory computer-readable medium that stores a set of instructions for wireless communication by a central or management entity of an IAB network. The set of instructions, when executed by one or more processors of the central or management entity, may cause the central or management entity to receive a report indicating a radio link quality between an IAB DU and an IAB MT associated with an IAB node. The set of instructions, when executed by one or more processors of the IAB, may cause the IAB to optimize a coverage of the IAB network based at least in part on the radio link quality.

Some aspects described herein relate to an apparatus of a central or management entity of an IAB network. The apparatus may include means for receiving a report indicating one or more of a failure associated with a communication link associated with an IAB node included in the IAB network or a QoS associated with the communication link. The apparatus may include means for modifying a topography of the IAB network or routing within the IAB network when the report indicates the failure associated with the communication link. The apparatus may include means for verifying a QoS associated with the communication link when the report indicates the QoS associated with the communication link.

Some aspects described herein relate to an apparatus of a central or management entity of an IAB network. The apparatus may include means for receiving a report indicating a radio link quality between an IAB DU and an IAB MT associated with an IAB node. The apparatus may include means for causing, based on the radio link quality between the IAB DU and the IAB MT, the IAB node to transition from an active state to an inactive state or the IAB node to transition from the inactive state to the active state based at least in part on the radio link quality.

Some aspects described herein relate to an apparatus of a central or management entity of an IAB network. The of a central or management entity may include a memory and one or more processors coupled to the memory.

Some aspects described herein relate to an apparatus of a central or management entity of an IAB network. The apparatus may include means for receiving a report indicating a radio link quality between an IAB DU and an IAB MT associated with an IAB node. The apparatus may include means for optimizing a coverage of the IAB network based at least in part on the radio link quality.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
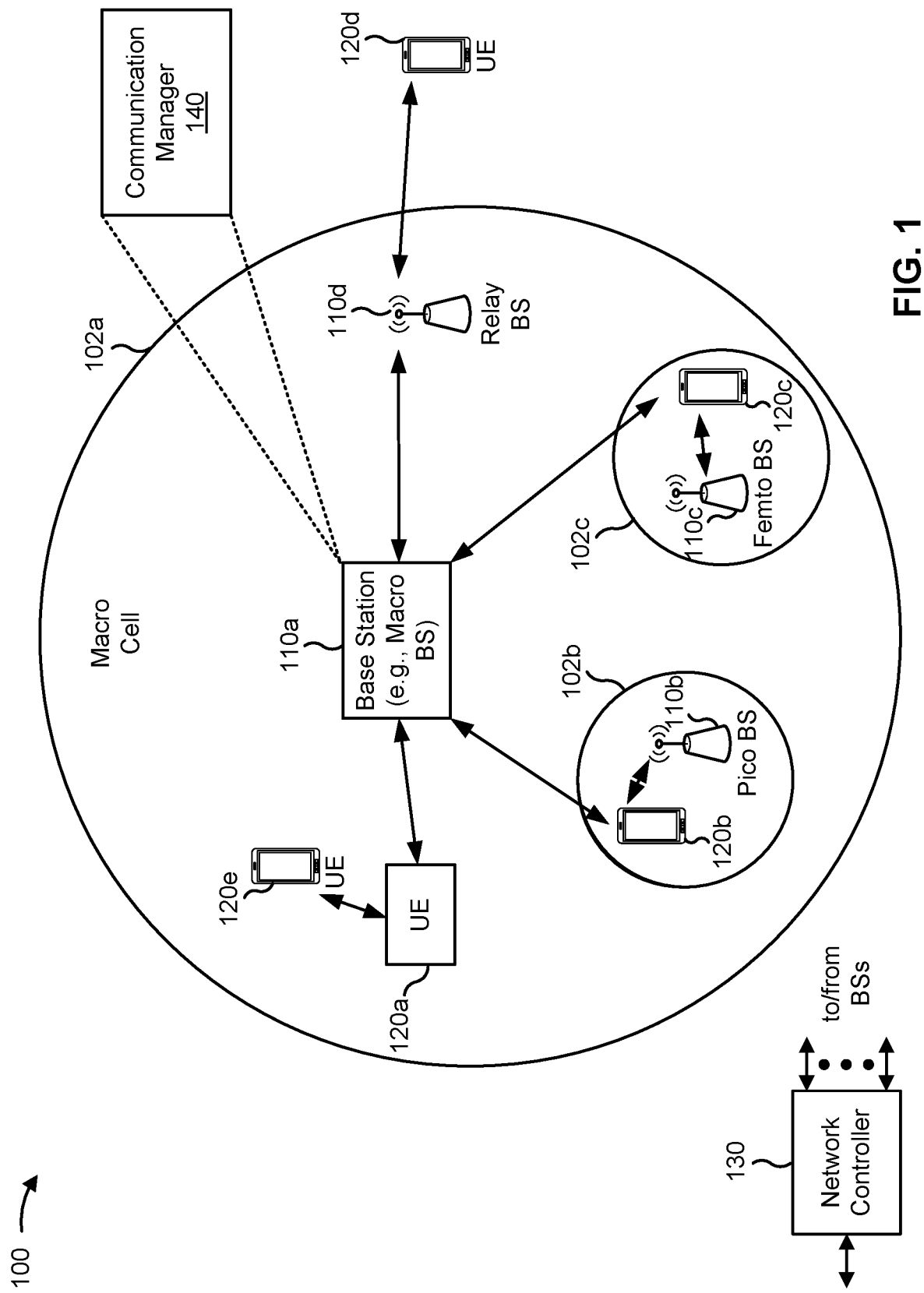
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 140. As described in more detail elsewhere herein, the communication manager 140 may perform one or more operations associated with IAB data collection. Additionally, or alternatively, the communication manager 150 may perform one or more other operations described herein.

As indicated above, FIG. 1 is provided as an example. Other examples may differ from what is described with regard to FIG. 1.

Figure 2:
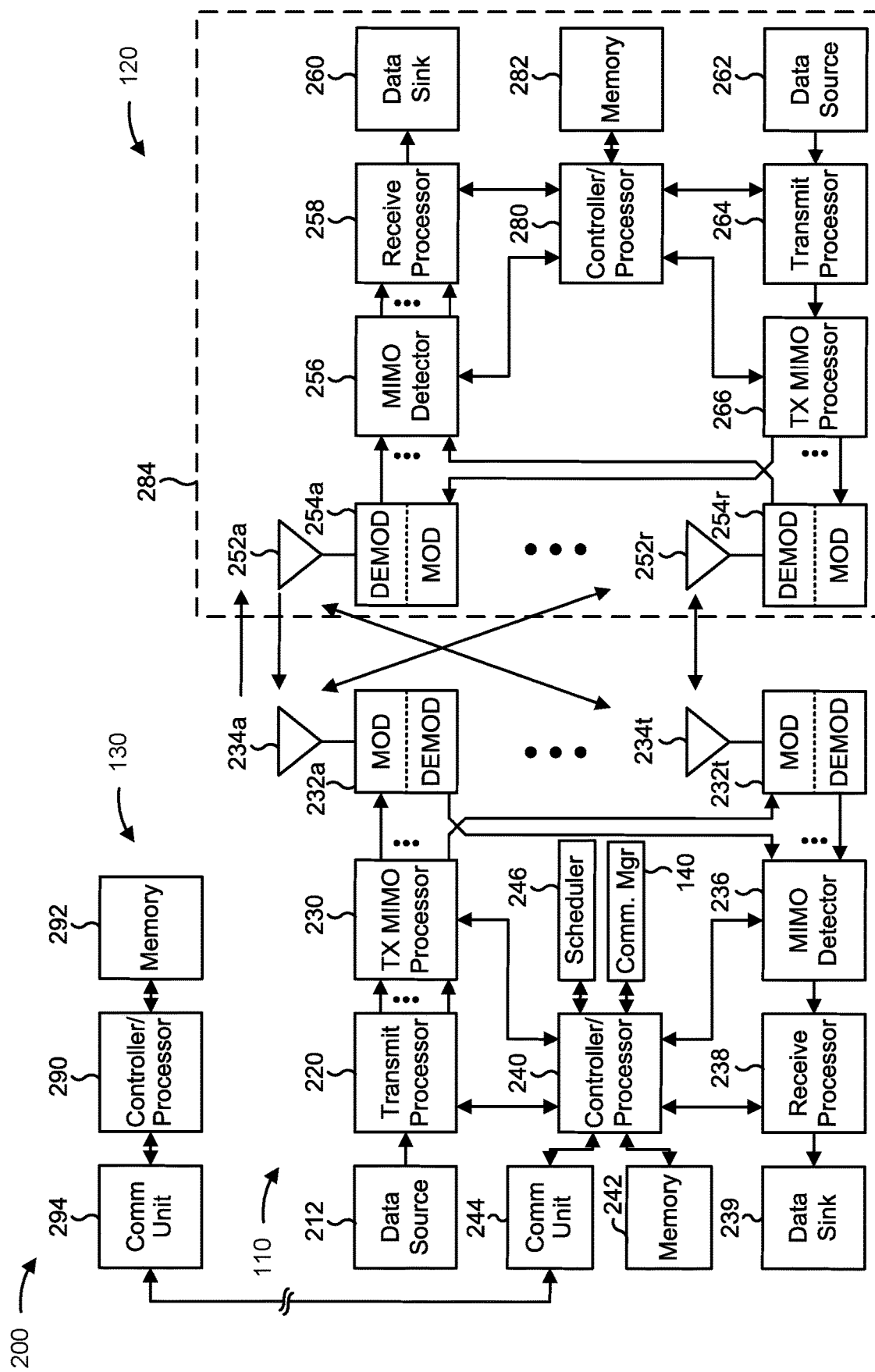
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with integrated access and backhaul (IAB) data collection, as described in more detail elsewhere herein. In some aspects, the IAB node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, an apparatus of a central or management entity of an IAB network (e.g., an IAB node and/or base station 110) may include means for receiving a report indicating one or more of a failure associated with a communication link associated with an IAB node included in the IAB network or a quality of service (QoS) associated with the communication link, means for modifying a topography of the IAB network or routing within the IAB network when the report indicates the failure associated with the communication link, means for verifying a QoS associated with the communication link when the report indicates the QoS associated with the communication link, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

In some aspects, an apparatus of a central or management entity of an IAB network (e.g., an IAB node and/or base station 110) may include means for receiving a report indicating a radio link quality between an IAB distributed unit (DU) and an IAB mobile terminal (MT) associated with an IAB node, means for causing, based on the radio link quality between the IAB DU and the IAB MT, the IAB node to transition from an active state to an inactive state or the IAB node to transition from the inactive state to the active state based at least in part on the radio link quality, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

In some aspects, an apparatus of a central or management entity of an IAB network (e.g., an IAB node and/or base station 110) may include means for receiving a report indicating a radio link quality between an IAB DU and an IAB MT associated with an IAB node, means for modifying, based on the radio link quality between the IAB DU and the IAB MT, a routing of data through the IAB network, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

In some aspects, an apparatus of a central or management entity of an IAB network (e.g., an IAB node and/or base station 110) may include means for receiving a report indicating a radio link quality between an IAB DU and an IAB MT associated with an IAB node, means for optimizing a coverage of the IAB network based at least in part on the radio link quality, or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
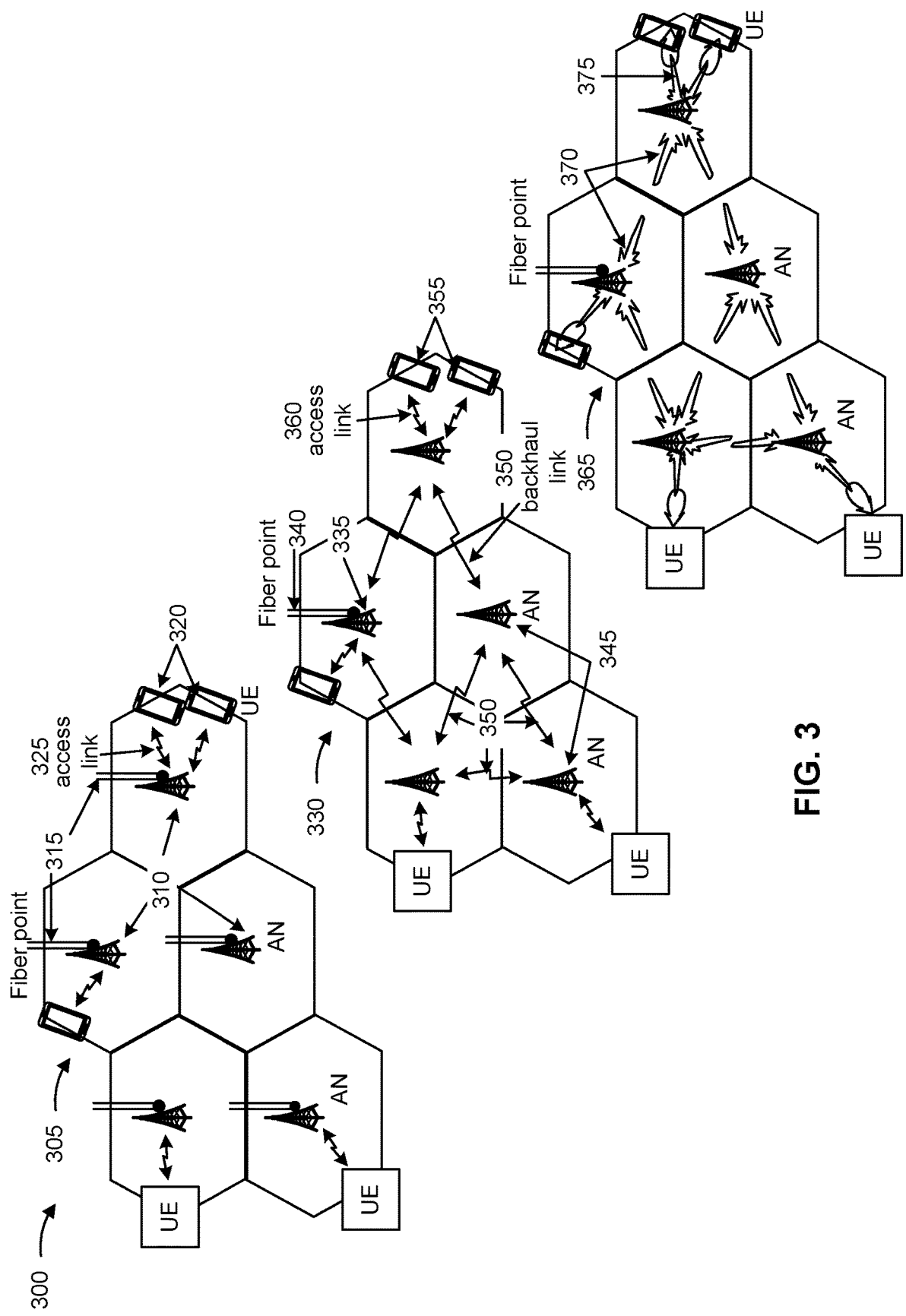
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
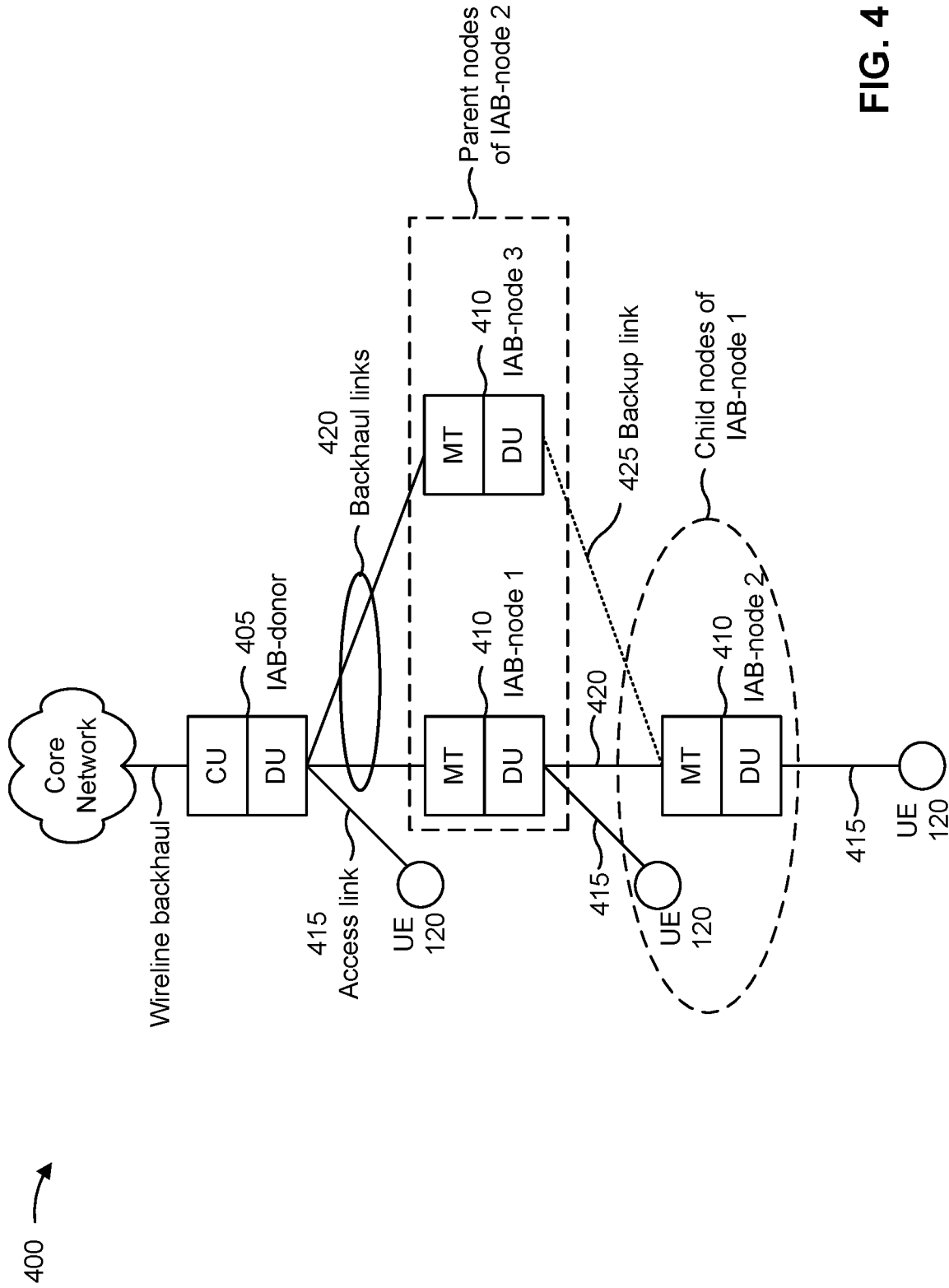
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

In some cases, a central or management entity of an IAB network, an IAB donor, a trace collection entity (TCE), or an IAB parent node may be configured to schedule resources, modify a topography of the IAB network, modify routing of data through the IAB network, or verify a quality of service (QoS) of the IAB network based at least in part a current condition of the IAB network. For example, a central entity of an IAB network may modify a topography or a routing of the IAB network to address an issue (e.g., a radio link failure (RLF) or a level of congestion between two IAB nodes). However, the central entity may lack information regarding various aspects of one or more of the IAB nodes included in the IAB network. For example, the central entity may lack information regarding a quantity of successful and/or unsuccessful radio access RA) procedures performed by an IAB-DU and an IAB-MT, a quantity of failed connection establishment attempts made by an IAB-MT, failure information associated with a secondary cell group (SCG), or failure information associated with a main cell group (MCG).

Some techniques and apparatuses described herein enable the reporting and collection of IAB node data between nodes (e.g., between IAB nodes and/or between logical nodes of an IAB node) of an IAB network. For example, an IAB node may generate a report indicating a status of a communication link and/or a QoS associated with the IAB node, among other examples. The IAB node may provide the report to an IAB parent node, an IAB donor, and/or a central or management entity of the IAB network. The IAB parent node, the IAB donor, and/or the central or management entity may configure (e.g., optimize) an operation of the IAB network (e.g., by modifying a topography of the IAB network and/or routing within the IAB network) and/or verify a QoS associated with the IAB network or the communication link based at least in part on the report. In this way, IAB node data may be effectively and efficiently shared between nodes of the IAB network, thereby enabling the IAB parent node, the IAB donor, and/or the central or management entity to effectively management and/or optimize the IAB network.

As indicated above, FIG. 4 is provided as an example. Other examples may differ from what is described with regard to FIG. 4.

Figure 5:
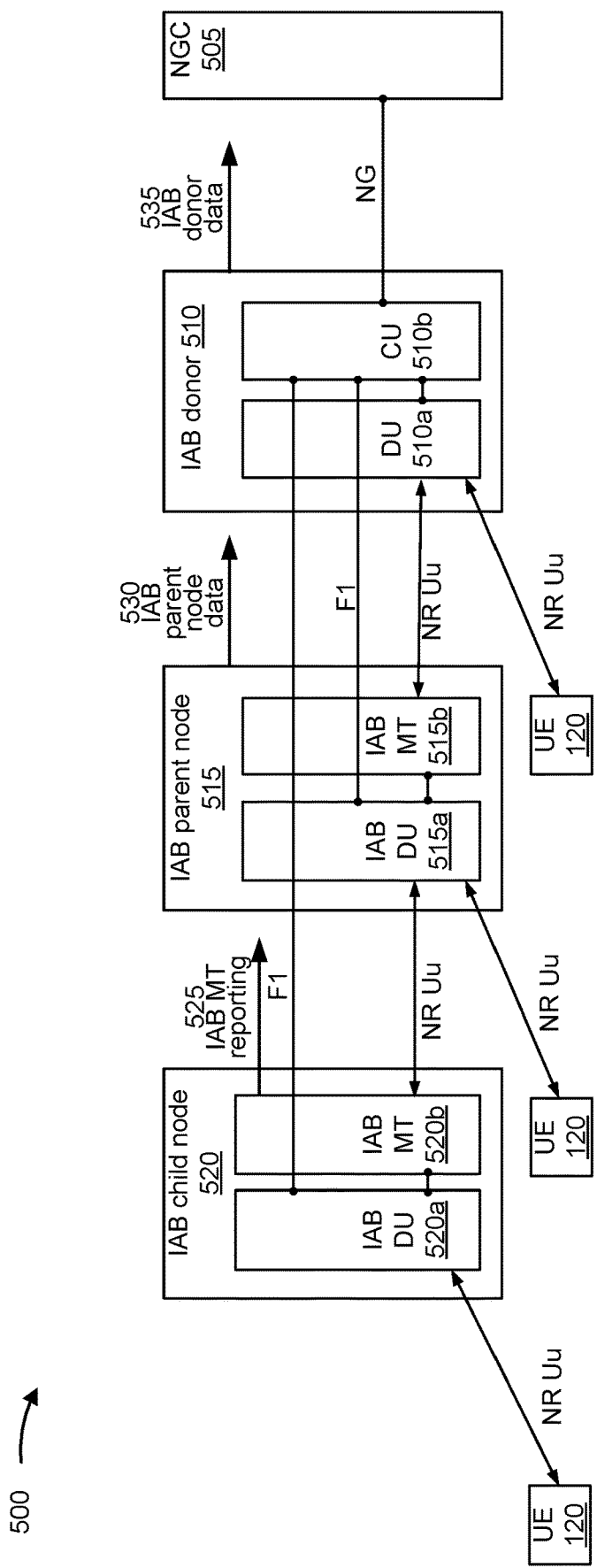
FIG. 5 is a diagram illustrating an example associated with IAB data collection, in accordance with the present disclosure.

FIG. 5 is a diagram illustrating an example 500 associated with IAB data collection, in accordance with the present disclosure. As shown in FIG. 5, example 500 includes communication between a next-generation controller (NGC) 505, an IAB donor 510, an IAB parent node 515, and an IAB child node 520 of an IAB network.

As shown in FIG. 5, the IAB donor 510 may include a CU 510*b* that is connected to the NGC 505 via a communication link associated with a next-generation (NG) interface. The CU 510*b* may also be connected to an IAB DU 515*a* of the IAB parent node 515 and an IAB DU 520*a* of the IAB child node 520 via a pair of communication links established via respective F1 interfaces. Additionally, a communication link may be established between the CU 510*b* and a DU 510*a* of the IAB donor 510. In some aspects, as shown in FIG. 5, the DU 510*a* is connected to a UE 120 via a communication link established via an NR Uu interface of the DU 510*a*.

The IAB parent node 515 may include an IAB DU 515*a* that is connected to an IAB MT 515*b* of the IAB parent node 515. The IAB DU 515*a* may be connected to the CU 510*b* via a communication link established via an F1 interface. The IAB DU 515*a* may also be connected to an IAB MT 520*b* of the IAB child node 520 via a communication link established via an NR Uu interface. In some aspects, as shown in FIG. 5, the IAB DU 515*a* may be connected to a UE 120 via a communication link established via an NG Uu interface of the IAB DU 515*a*.

As further shown in FIG. 5, the IAB DU 520*a* may be connected to an IAB MT 520*b* of the IAB child node 520. In some aspects, as shown in FIG. 5, the IAB DU 520*a* may be connected to a UE 120 via a communication link established via an NR Uu interface of the IAB DU 520*a*.

As shown by reference number 525, the IAB child node 520 may perform IAB MT reporting to provide IAB child node data to the IAB parent node 515, the IAB donor 510, and/or the NGC 505. For example, the IAB child node 520 may provide IAB child node data to the IAB parent node 515 via the communication link established between the IAB MT 520*b* and the IAB DU 515*a*. The IAB child node 520 may provide IAB child node data to the IAB donor 510 via the communication link established between the IAB DU 520*a* and the CU 510*b*. The IAB child node 520 may provide IAB child node data to the NGC 505 via the IAB donor 510. In some aspects, the IAB child node 520 may perform the IAB MT reporting via a self-organizing or self-optimizing network (SON) report or a minimization of drive test (MDT) report. For example, as described in greater detail elsewhere herein, the IAB child node data may include an RLF report, an SCG Failure Information report, an MCG Failure Information report, an RA report, a connection establishment report, an M4 (e.g., data volume) report, an M5 (e.g., UE downlink and uplink throughput) report, an M6 (e.g., RAN uplink and downlink delay) report, and/or an M7 (e.g., packet loss rate) report.

In some aspects, the IAB child node data may indicate a failure associated with a communication link of the IAB child node 520. For example, the IAB child node data may include an RLF report, an MCG failure information report, an RA report, and/or a connection establishment failure report.

In some aspects, the RLF report may indicate an RLF of a connection associated with the IAB child node 520. For example, the RLF report may indicate an RLF between the IAB DU 520*a* and the IAB MT 520*b*. In some aspects, the RLF report included in the IAB child node data may correspond to an RLF report generated by a UE (e.g., UE 120) to report an RLF to a base station. In some aspects, the RLF report may indicate that the RLF report is associated with the communication link between the IAB DU 520*a* and the IAB MT 520*b* (e.g., rather than a communication link between the IAB DU 520*a* and the UE 120).

In some aspects, the MCG failure information report may indicate a radio issue associated with a connection of the IAB child node 520. For example, the MCG failure information report may indicate a radio issue between a secondary IAB DU 520*a* of the IAB child node 520 and a secondary IAB MT 520*b*, such as a measurement that fails to satisfy a threshold, a threshold number of dropped communications, or the like.

In some aspects, the RA report may indicate a status of an RA procedure between the IAB DU 520*a* and the IAB MT 520*b*. In some aspects, the RA report may indicate a physical random access channel (PRACH) configuration period associated with the IAB child node 520. Alternatively, and/or additionally, the RA report may indicate a PRACH configuration offset associated with the IAB child node 520.

In some aspects, the RA report may indicate additional information associated with the RA procedure. For example, the RA report may indicate whether a random access channel (RACH) message is received on a non-available resource, a quantity of occurrences of the RACH message being received on the non-available resource, a quantity of occurrences of the RACH message being received on a soft resource, and/or a quantity of occurrence of the RACH message being received on a hard resource.

In some aspects, the connection establishment failure report may indicate one or more connection establishment failure attempts by the IAB MT 520*b*. In some aspects, the connection establishment failure report may include a LBT failure status report associated with the IAB MT 520*b* and/or an LBT failure status report associated with a UE 120 connected to the IAB child node 520.

The IAB child node 520 may provide IAB child node data to the IAB parent node 515 (e.g., via the communication link established between the IAB MT 520*b* and the IAB DU 515*a*), the IAB donor 510 (e.g., via the communication link established between the IAB DU 520*a* and the CU 510*b*), and/or the NGC 505 (e.g., via the IAB donor 510). In some aspects, the IAB child node 520 provides the IAB child node data periodically. Alternatively, and/or additionally, the IAB child node 520 may provide the IAB child node data based at least in part on receiving a request from the IAB parent node 515, the IAB donor 510, and/or the NGC 505.

In some aspects, the IAB child node data may indicate a QoS associated with a communication link of the IAB child node 520. The IAB child node data may include one or more metrics associated with an access communication link of the IAB child node 520 and/or one or more metrics associated with an IAB backhaul communication link of the IAB child node 520.

In some aspects, the IAB child node 520 obtains the one or more metrics associated with the access communication link separate from the one or more metrics associated with the IAB backhaul communication link. For example, the IAB child node 520 may obtain the one or more metrics associated with the access communication link and the one or more metrics associated with the IAB backhaul communications link based at least in part on transmitting a packet transmitted over the access communication link and transmitting another packet over the IAB backhaul communication link.

In some aspects, the one or more metrics associated with the access communication link may indicate a volume of data associated with the access communication link, a UE downlink throughput associated with the access communication link, a UE uplink throughput associated with the access communication link, a RAN uplink delay associated with the access communication link, a RAN downlink delay associated with the access communication link, and/or a packet loss rate associated with the access communication link. In some aspects, the one or more metrics may be provided a SON report or an MDT report.

In some aspects, the one or more metrics associated with the IAB backhaul communication link may indicate a volume of data associated with the IAB backhaul communication link, a UE downlink throughput associated with the IAB backhaul communication link, a UE uplink throughput associated with the IAB backhaul communication link, a RAN uplink delay associated with the IAB backhaul communication link, a RAN downlink delay associated with the IAB backhaul communication link, and/or a packet loss rate associated with the IAB backhaul communication link.

In some aspects, the one or more metrics associated with the access communication link and/or the one or more metrics associated with the IAB backhaul communication link may include a metric associated with a 2-step random access channel (RACH) procedure performed by the IAB child node 520, a metric associated with a 4-step RACH procedure performed by the IAB child node 520, a metric associated with a contention-based RA (CBRA) procedure performed by the IAB child node 520, and/or a metric associated with a contention free RA (CFRA) procedure performed by the IAB node.

In some aspects, the one or more metrics associated with the access communication link and/or the one or more metrics associated with the IAB backhaul communication link may include a power headroom measure associated with the IAB child node 520, a quantity of intra-control unit (CU)-control plane (CP) handover procedures performed by the IAB child node 520, a quantity of inter-CU-CP handover procedures performed by the IAB child node 520, a quantity of interruptions occurring during the intra-CU-CP handover procedures, a quantity of interruptions occurring during the inter-CU-CP handover procedures, and/or a quantity of interruptions occurring during topology adaptation procedures.

Alternatively, and/or additionally, the IAB child node data may indicate an amount of congestion associated with the IAB child node 520 and/or a parameter indicating a load experienced by the IAB child node 520. The IAB child node 520 may perform a congestion computation to determine an amount of congestion associated with the IAB DU 520*a* and/or the IAB MT 520*b* and may include an indication of the amount of congestion associated with the IAB DU 520*a* and/or the IAB MT 520*b* in the IAB child node data. In some aspects, the IAB child node 520 may perform the congestion computation per backhaul adaptation protocol (BAP) routing identifier within a measurement pool.

In some aspects, the IAB child node data may indicate connection information. For example, the IAB child node data may indicate a quantity of IAB MT nodes connected to the IAB child node 520, a quantity of UEs connected to the IAB child node 520, a radio link quality between the IAB child node 520 and a UE, and/or a radio link quality between the IAB DU 520*a* and the IAB MT 520*b*.

In some aspects, the IAB child node data may include UE mobility history information. The UE mobility history information may indicate a history of serving cells generated and/or reported by UEs connected to the IAB child node 520.

In some aspects, the IAB child node data may include coverage and capacity optimization (CCO) information. The CCO information may enable the IAB parent node 515, the IAB donor 510, and/or the NGC 505 to optimize resource co-ordination and/or avoid collisions between the IAB DU 520*a* and the IAB MT 520*b* and/or between IAB nodes of the IAB network.

In some aspects, to optimize coverage and capacity while minimizing interference (e.g., between the IAB DU 520*a* and the IAB MT 520*b*, between different IAB nodes, and/or between different beams) in the IAB network, the IAB child node 520 may provide, to the NGC 505, IAB child node data that includes CCO information indicating a resource configuration of the IAB DU 520*a*, a cell specific signal associated with the IAB DU 520*a*, a channel allocation associated with the IAB DU 520*a*, the CU 510*b* of the IAD donor 510, the parent IAB node 515, and location information for the IAB child node 520.

In some aspects, the IAB network may include a SON and the IAB child node data may include SON information. The SON information may be configured to enhance automatic configuration of the IAB network. For example, the SON information may enable the IAB network to be automatically configured to avoid collisions between DU synchronization signal block (SSB) transmissions and SSB discovery or measurements performed by a corresponding MT (e.g., IAB MT 520*b*). In some aspects, the SON information may indicate an IAB-MT SSB measurement timing configuration (SMTC) configuration (e.g., smtc3list), an IAB-MT SSB transmission configuration (STC), the CU 510*b* of the IAD donor 510, the parent IAB node 515, and location information for the IAB child node 520.

In some aspects, the IAB child node data may include information associated with the IAB child node 520. For example, the IAB child node data may include cell identity information associated with the IAB child node 520, a backhaul adaptation protocol (BAP) routing identifier associated with the IAB child node 520, and/or an IAB RLC logical channel associated with the IAB child node 520.

As shown by reference number 530, the IAB parent node 515 may perform IAB MT reporting to provide IAB parent node data to the IAB donor 510 and/or the NGC 505. For example, the IAB parent node 515 may provide IAB parent node data to the IAB donor 510 via the communication link established between the IAB DU 515*a* and the CU 510*b* and/or via the communication link established between the IAB MT 515*b* and the DU 510*a*. The IAB parent node 515 may provide IAB parent node data to the NGC 505 via the IAB donor 510.

In some aspects, the IAB parent node data may indicate a failure of a communication link associated with the IAB parent node 515 and/or a QoS associated with the communication link. In some aspects, the IAB parent node data includes information associated with the IAB parent node 515 that is similar to the information included in the IAB child node data. For example, the IAB parent node 515 may perform IAB MT reporting via a SON or MDT report, such as an RLF report, an SCG Failure Information report, an MCG Failure Information report, an RA report, a connection establishment report, an M4 (e.g., data volume) report, an M5 (e.g., UE downlink and uplink throughput) report, an M6 (e.g., RAN uplink and downlink delay) report, and/or an M7 (packet loss rate) report.

In some aspects, the IAB parent node data includes the IAB child node data. For example, the IAB parent node 515 may receive the IAB child node data from the IAB child node 520 and may generate IAB parent node data that includes the IAB child node data received from the IAB child node 520 and IAB data associated with the IAB parent node 515.

In some aspects, the IAB parent node 515 may verify a QoS associated with the IAB network or the communication link. For example, the IAB parent node 515 may verify the QoS based at least in part on an end-to-end delay associated with a BAP routing identifier of the IAB child node 520 (e.g., based at least in part on comparing the end-to-end delay to a threshold associated with the QoS). As another example, the IAB parent node 515 may verify the QoS based at least in part on a hop-by-hop delay associated with the BAP routing identifier (e.g., based at least in part on comparing the hop-by-hop delay to a threshold associated with the QoS). As yet another example, the IAB parent node 515 may verify the QoS based at least in part on a quantity of hops associated with the BAP routing identifier. In some aspects, the IAB parent node 515 may verify a QoS associated with the IAB network based at least in part on IAB child node data for multiple communication links.

In some aspects, the IAB parent node 515 may modify a topography of the IAB network or routing within the IAB network. For example, the IAB parent node 515 may optimize a portion of the IAB network based at least in part on the IAB child node data. For example, the IAB child node data may indicate a radio link quality between the IAB DU 520*a* and the IAB MT 520*b* and the IAB parent node 515 may transmit an indication to cause the IAB child node 520 to transition from an active state to an inactive state based at least in part on the radio link quality (e.g., based at least in part on the radio link quality failing to satisfy a quality threshold). Alternatively, and/or additionally, the IAB donor 510 may transmit an indication to cause the IAB child node 520 to transition from the inactive state to the active state based at least in part on the radio link quality (e.g., based at least in part on the radio link quality satisfying a quality threshold). In some aspects, the IAB parent node 515 may cause packet rerouting within the IAB network based at least in part on the radio link quality.

In some aspects, the IAB parent node 515 may cause the IAB child node 520 to transition from the active state to the inactive state, to transition from the inactive state to the active state, and/or perform routing adjustments in the IAB network based at least in part on an additional metric indicated in the IAB child node data. In some aspects, the additional metric may include load information associated with the IAB child node 520, a quantity of active UEs associated with the IAB child node 520, a quantity of inactive UEs associated with the IAB child node 520, and/or a quantity of IAB nodes attached to the IAB DU 520*a* of the IAB child node 520.

As shown by reference number 535, the IAB donor 510 may perform IAB MT reporting to provide IAB donor data to the NGC 505. For example, the IAB donor 510 may provide IAB donor data to the NGC 505 via the communication link established via the CU 510*b* and the NGC 505.

In some aspects, the IAB donor data may indicate a failure of a communication link associated with the IAB donor 510 and/or a QoS associated with the communication link. In some aspects, the IAB donor data includes information associated with the IAB donor 510 that is similar to the information included in the IAB child node data. For example, the IAB donor 510 may perform IAB MT reporting via a SON or MDT report, such as an RLF report, an SCG Failure Information report, an MCG Failure Information report, an RA report, a connection establishment report, an M4 (e.g., data volume) report, an M5 (e.g., UE downlink and uplink throughput) report, an M6 (e.g., RAN uplink and downlink delay) report, and/or an M7 (packet loss rate) report.

In some aspects, the IAB data includes the IAB parent node data and/or the IAB child node data. For example, the IAB donor 510 may receive the IAB parent node data from the IAB parent node 515. In some aspects, the IAB parent node data includes the IAB child node data. In some aspects, the IAB donor 510 receives the IAB child node data from the IAB child node 520. The IAB donor 510 may generate IAB donor data that includes the IAB parent node data, the IAB child node data, and/or IAB data associated with the IAB donor 510.

In some aspects, the IAB donor 510 may verify a QoS associated with the IAB network or the communication link. For example, the IAB donor 510 may verify the QoS based at least in part on an end-to-end delay associated with a BAP routing identifier of the IAB child node 520 (e.g., based at least in part on comparing the end-to-end delay to a threshold associated with the QoS). As another example, the IAB donor 510 may verify the QoS based at least in part on a hop-by-hop delay associated with the BAP routing identifier (e.g., based at least in part on comparing the hop-by-hop delay to a threshold associated with the QoS). As yet another example, the IAB donor 510 may verify the QoS based at least in part on a quantity of hops associated with the BAP routing identifier. In some aspects, the IAB donor 510 may verify a QoS associated with the IAB network based at least in part on IAB child node data for multiple communication links.

In some aspects, the IAB donor 510 may modify a topography of the IAB network or routing within the IAB network. For example, the IAB donor 510 may optimize a portion of the IAB network based at least in part on the IAB parent node data and/or the IAB child node data. For example, the IAB child node data may indicate a radio link quality of a communication link between the IAB DU 520a and the IAB MT 520b and the IAB donor 510 may transmit an indication to cause the IAB child node 520 to transition from an active state to an inactive state based at least in part on the radio link quality (e.g., based at least in part on the radio link quality failing to satisfy a quality threshold or based at least in part on a report indicating a failure associated with the communication link). Alternatively, and/or additionally, the IAB donor 510 may transmit an indication to cause the IAB child node 520 to transition from the inactive state to the active state based at least in part on the radio link quality (e.g., based at least in part on the radio link quality satisfying a quality threshold). In some aspects, the IAB donor 510 may cause packet rerouting within the IAB network based at least in part on the radio link quality.

As another example, the IAB parent node data may indicate a radio link quality between the IAB DU 515a and the IAB MT 515b and the IAB donor 510 may cause the IAB parent node 515 to transition from an active state to an inactive state based at least in part on the radio link quality (e.g., based at least in part on the radio link quality failing to satisfy a quality threshold). Alternatively, and/or additionally, the IAB donor 510 may cause the IAB parent node 515 to transition from the inactive state to the active state based at least in part on the radio link quality (e.g., based at least in part on the radio link quality satisfying a quality threshold). In some aspects, the IAB donor 510 may cause packet rerouting within the IAB network based at least in part on the radio link quality.

In some aspects, the IAB donor 510 may cause the IAB child node 520 and/or the IAB parent node 515 to transition from the active state to the inactive state, to transition from the inactive state to the active state, and/or perform routing adjustments in the IAB network based at least in part on an additional metric indicated in the IAB parent node data and/or the IAB child node data. In some aspects, the additional metric may include load information associated with the IAB parent node 515 and/or the IAB child node 520, a quantity of active UEs associated with the IAB parent node 515 and/or the IAB child node 520, a quantity of inactive UEs associated with the IAB parent node 515 and/or the IAB child node 520, a quantity of IAB nodes attached to the IAB DU 520a of the IAB child node 520 and/or a quantity of IAB nodes attached to the IAB DU 515a of the IAB parent node 515.

In some aspects, the NGC 505 may receive the IAB donor data, the IAB parent node data, and/or the IAB child node data from the IAB donor 510 and may verify a QoS associated with the IAB network and/or optimize a portion of the IAB network based at least in part on the IAB donor data, the IAB parent node data, and/or the IAB child node data. For example, the IAB child node data may indicate a radio link quality between the IAB DU 520a and the IAB MT 520b and the NGC 505 may cause the IAB child node 520 to transition from an active state to an inactive state based at least in part on the radio link quality (e.g., based at least in part on the radio link quality failing to satisfy a quality threshold). Alternatively, and/or additionally, the NGC 505 may cause the IAB child node 520 to transition from the inactive state to the active state based at least in part on the radio link quality (e.g., based at least in part on the radio link quality satisfying a quality threshold). In some aspects, the NGC 505 may cause packet rerouting within the IAB network based at least in part on the radio link quality between the IAB DU 520a and the IAB MT 520b.

As another example, the IAB parent node data may indicate a radio link quality between the IAB DU 515a and the IAB MT 515b and the NGC 505 may cause the IAB parent node 515 to transition from an active state to an inactive state based at least in part on the radio link quality (e.g., based at least in part on the radio link quality failing to satisfy a quality threshold). Alternatively, and/or additionally, the NGC 505 may cause the IAB parent node 515 to transition from the inactive state to the active state based at least in part on the radio link quality (e.g., based at least in part on the radio link quality satisfying a quality threshold). In some aspects, the NGC 505 may cause packet rerouting within the IAB network based at least in part on the radio link quality between the IAB DU 515a and the IAB MT 515b.

As another example, the IAB donor data may indicate a radio link quality between the DU 510a and the CU 510b and the NGC 505 may cause the IAB donor 510 to transition from an active state to an inactive state based at least in part on the radio link quality (e.g., based at least in part on the radio link quality failing to satisfy a quality threshold). Alternatively, and/or additionally, the NGC 505 may cause the IAB donor 510 to transition from the inactive state to the active state based at least in part on the radio link quality (e.g., based at least in part on the radio link quality satisfying a quality threshold). In some aspects, the NGC 505 may cause packet rerouting within the IAB network based at least in part on the radio link quality between the DU 510a and the CU 510b.

In some aspects, the IAB donor 510 may modify the topography of the IAB network or routing within the IAB network. For example, the IAB donor 510 may cause the IAB child node 520 and/or the IAB parent node 515 to transition from the active state to the inactive state, to transition from the inactive state to the active state, and/or perform routing adjustments in the IAB network based at least in part on an additional metric indicated in the IAB parent node data and/or the IAB child node data. In some aspects, the additional metric may include load information associated with the IAB parent node 515 and/or the IAB child node 520, a quantity of active UEs associated with the IAB parent node 515 and/or the IAB child node 520, a quantity of inactive UEs associated with the IAB parent node 515 and/or the IAB child node 520, a quantity of IAB nodes attached to the IAB DU 520a of the IAB child node 520 and/or a quantity of IAB nodes attached to the IAB DU 515a of the IAB parent node 515.

As indicated above, FIG. 5 is provided as an example. Other examples may differ from what is described with respect to FIG. 5.

Figure 6:
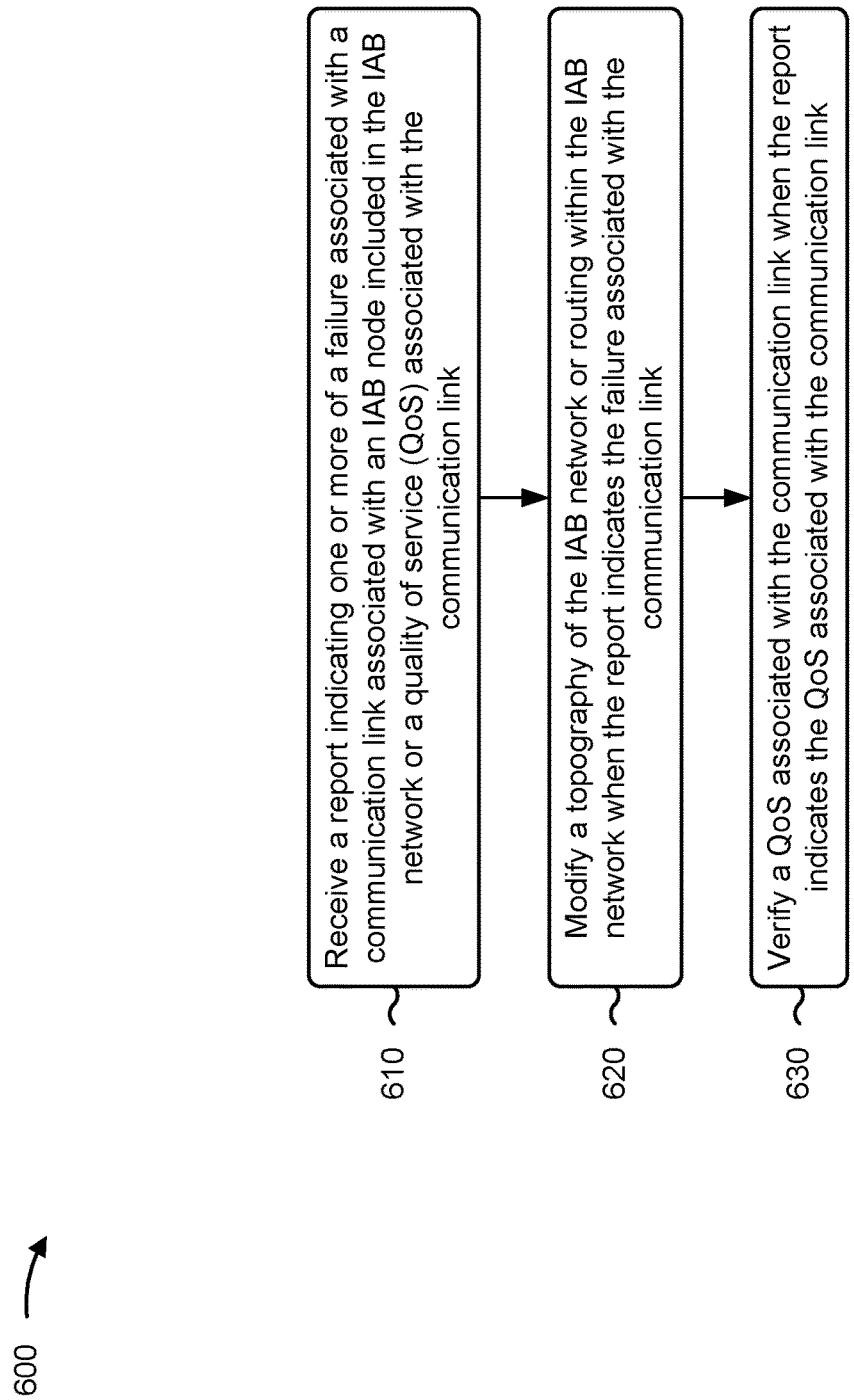
FIGS. 6-9 are diagrams illustrating example processes associated with IAB data collection, in accordance with the present disclosure.

FIG. 6 is a diagram illustrating an example process 600 performed, for example, by an apparatus of a central or management entity of an IAB network, in accordance with the present disclosure. Example process 600 is an example where the apparatus of the central or management entity (e.g., NGC 505, IAB donor 510, and/or IAB parent node 515) performs operations associated with IAB data collection.

As shown in FIG. 6, in some aspects, process 600 may include receiving a report indicating one or more of a failure associated with a communication link associated with an IAB node included in the IAB network or a QoS associated with the communication link (block 610). For example, the central or management entity (e.g., using communication manager 140 and/or reception component 1002, depicted in FIG. 10) may receive a report indicating one or more of a failure associated with a communication link associated with an IAB node included in the IAB network or a QoS associated with the communication link, as described above.

As further shown in FIG. 6, in some aspects, process 600 may include modifying a topography of the IAB network or routing within the IAB network when the report indicates the failure associated with the communication link (block 620). For example, the central or management entity (e.g., using communication manager 140 and/or modification component 1008, depicted in FIG. 10) may modify a topography of the IAB network or routing within the IAB network when the report indicates the failure associated with the communication link, as described above.

As further shown in FIG. 6, in some aspects, process 600 may include verifying a QoS associated with the IAB network when the report indicates the QoS associated with the communication link (block 630). For example, the central or management entity (e.g., using communication manager 140 and/or verification component 1010, depicted in FIG. 10) may verify a QoS associated with the communication link when the report indicates the QoS associated with the communication link, as described above.

Process 600 may include additional aspects, such as any single aspect or any combination of aspects described below and/or in connection with one or more other processes described elsewhere herein.

In a first aspect, the report includes one or more of an RLF report indicating an RLF between an IAB DU and an IAB MT, cell group failure information indicating a radio issue between a secondary IAB DU and a secondary IAB MT, an RA report indicating a status of an RA procedure between the IAB DU and the IAB MT, or a connection establishment failure report indicating one or more connection establishment failure attempts by the IAB MT.

In a second aspect, alone or in combination with the first aspect, the report includes one or more of an indication of a volume of data associated with the IAB node, an indication of a UE downlink throughput associated with the IAB node, an indication of a UE uplink throughput associated with the IAB node, an indication of a RAN downlink delay associated with the IAB node, an indication of a RAN uplink delay associated with the IAB node, or an indication of a packet loss rate associated with the IAB node.

In a third aspect, alone or in combination with one or more of the first and second aspects, the report indicates an amount of congestion associated with a BAP routing identifier.

In a fourth aspect, alone or in combination with one or more of the first through third aspects, the report includes an indication that the report is associated with an IAB MT of the IAB network.

In a fifth aspect, alone or in combination with one or more of the first through fourth aspects, the report includes a RACH parameter associated with the IAB node.

In a sixth aspect, alone or in combination with one or more of the first through fifth aspects, the report includes UE history information that is collected by the IAB node.

In a seventh aspect, alone or in combination with one or more of the first through sixth aspects, the report includes an RA report associated with an IAB MT, and wherein the RA report indicates one or more of that the RA report is associated with the IAB MT, a PRACH configuration period associated with the IAB node, or a PRACH configuration offset associated with the IAB node.

In an eighth aspect, alone or in combination with one or more of the first through seventh aspects, the report indicates one or more of whether a RACH is received on a non-available resource, a quantity of occurrences of the RACH being received on the non-available resource, a quantity of occurrences of the RACH being received on a soft resource, or a quantity of occurrence of the RACH being received on a hard resource.

In a ninth aspect, alone or in combination with one or more of the first through eighth aspects, the report includes one or more of an LBT failure status report associated with an IAB MT, or an LBT failure status report associated with a UE.

In a tenth aspect, alone or in combination with one or more of the first through ninth aspects, the report includes one or more first metrics associated with an access communication link of the IAB node and one or more second metrics associated with an IAB backhaul communication link of the IAB node, and wherein the QoS is verified based at least in part on one or more of the one or more first metrics or the one or more second metrics.

In an eleventh aspect, alone or in combination with one or more of the first through tenth aspects, the one or more first metrics include one or more of a volume of data associated with the access communication link, a UE downlink throughput associated with the access communication link, a UE uplink throughput associated with the access communication link, a RAN uplink delay associated with the access communication link, a RAN downlink delay associated with the access communication link, or a packet loss rate associated with the access communication link.

In a twelfth aspect, alone or in combination with one or more of the first through eleventh aspects, the one or more second metrics include one or more of a volume of data associated with the IAB backhaul communication link, a UE downlink throughput associated with the IAB backhaul communication link, a UE uplink throughput associated with the IAB backhaul communication link, a RAN uplink delay associated with the IAB backhaul communication link, a RAN downlink delay associated with the IAB backhaul communication link, or a packet loss rate associated with the IAB backhaul communication link.

In a thirteenth aspect, alone or in combination with one or more of the first through twelfth aspects, the IAB node obtains the one or more first metrics based at least in part on a first packet transmitted over the access communication link, and wherein the IAB node obtains the one or more second metrics based at least in part on a second packet transmitted over the IAB communication link.

In a fourteenth aspect, alone or in combination with one or more of the first through thirteenth aspects, the IAB node obtains the one or more first metrics separate from the one or more second metrics.

In a fifteenth aspect, alone or in combination with one or more of the first through fourteenth aspects, the report indicates one or more of celling identity information associated with the IAB node, a BAP routing identifier associated with the IAB node, or an IAB RLC logical channel associated with the IAB node.

In a sixteenth aspect, alone or in combination with one or more of the first through fifteenth aspects, the report indicates one or more of a quantity of IAB MT nodes connected to the IAB node, or a quantity of UEs connected to the IAB node.

In a seventeenth aspect, alone or in combination with one or more of the first through sixteenth aspects, the report indicates one or more of a metric associated with a 2-step RACH procedure performed by the IAB node, a metric associated with a 4-step RACH procedure performed by the IAB node, a metric associated with a CBRA procedure performed by the IAB node, or a metric associated with a CFRA procedure performed by the IAB node.

In an eighteenth aspect, alone or in combination with one or more of the first through seventeenth aspects, the report indicates one or more of a power headroom measure associated with the IAB node, a quantity of intra-CU-CP handover procedures performed by the IAB node, a quantity of inter-CU-CP handover procedures performed by the IAB node, a quantity of interruptions occurring during the intra-CU-CP handover procedures, a quantity of interruptions occurring during the inter-CU-CP handover procedures, or a quantity of interruptions occurring during topology adaptation procedures.

In a nineteenth aspect, alone or in combination with one or more of the first through eighteenth aspects, the report indicates a quantity of re-routed packets associated with an uplink communication channel and a quantity of re-routed packets associated with a downlink communication channel based at least in part on detecting an RLF at an IAB MT of the IAB node.

In a twentieth aspect, alone or in combination with one or more of the first through nineteenth aspects, the report indicates a parameter associated with a load experienced by the IAB node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
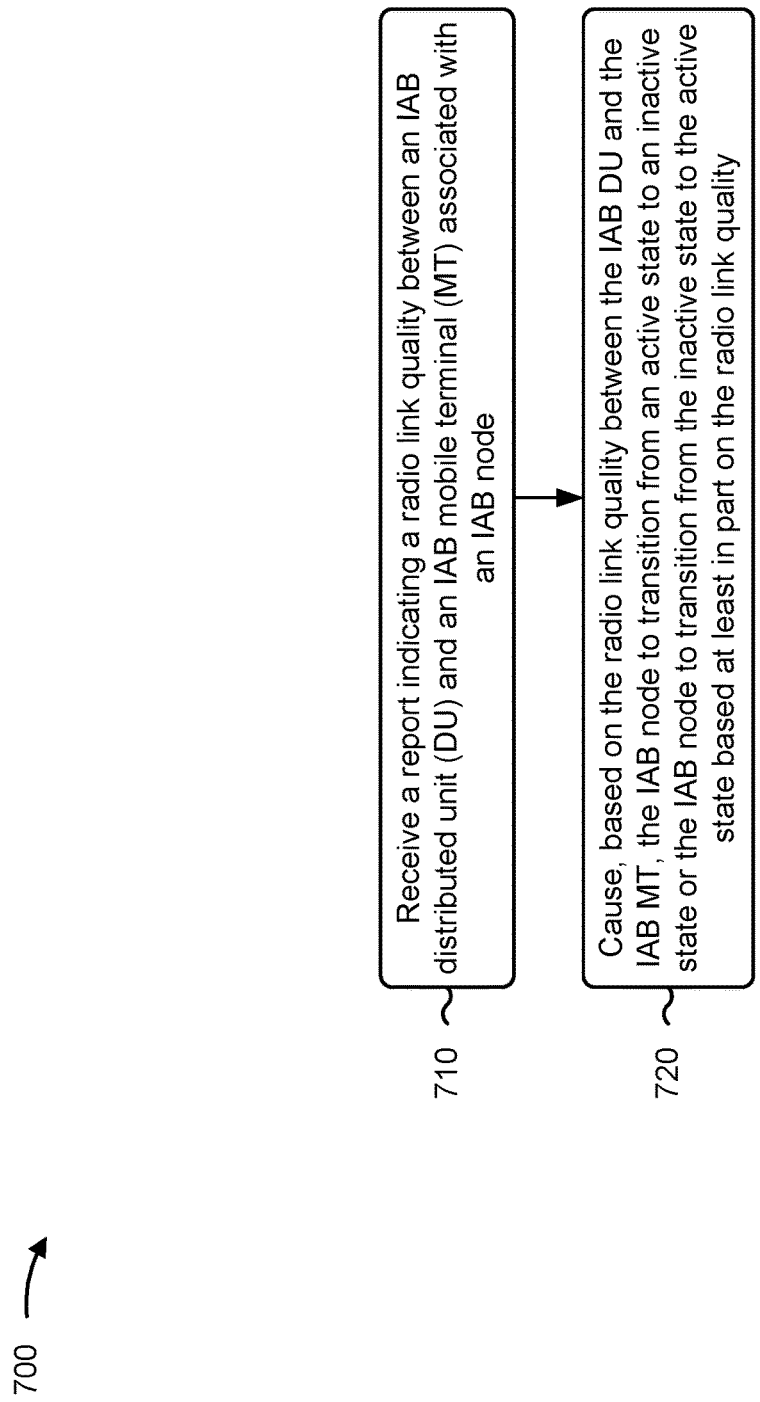

FIG. 7 is a diagram illustrating an example process 700 performed, for example, by an apparatus of a central or management entity of an IAB network, in accordance with the present disclosure. Example process 700 is an example where the apparatus of the central or management entity (e.g., NGC 505, IAB donor 510, and/or IAB parent node 515) performs operations associated with IAB data collection.

As shown in FIG. 7, in some aspects, process 700 may include receiving a report indicating a radio link quality between an IAB DU and an IAB MT associated with an IAB node (block 710). For example, the central or management entity (e.g., using communication manager 140 and/or reception component 1102, depicted in FIG. 11) may receive a report indicating a radio link quality between an IAB DU and an IAB MT associated with an IAB node, as described above.

As further shown in FIG. 7, in some aspects, process 700 may include causing, based on the radio link quality between the IAB DU and the IAB MT, the IAB node to transition from an active state to an inactive state or the IAB node to transition from the inactive state to the active state based at least in part on the radio link quality (block 720). For example, the apparatus (e.g., using communication manager 140 and/or usage component 1108, depicted in FIG. 11) may cause, based on the radio link quality between the IAB DU and the IAB MT, the IAB node to transition from an active state to an inactive state or the IAB node to transition from the inactive state to the active state based at least in part on the radio link quality, as described above.

Process 700 may include additional aspects, such as any single aspect or any combination of aspects described below and/or in connection with one or more other processes described elsewhere herein.

In a first aspect, the IAB node is caused to transition from the active state to the inactive state or to transition from the inactive state to the active state further based at least in part on an additional metric indicated in the report, and wherein the additional metric includes one or more of loading information associated with the IAB node, a quantity of active UEs associated with the IAB node, a quantity of inactive UEs associated with the IAB node, or a quantity of IAB nodes attached to the IAB DU.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
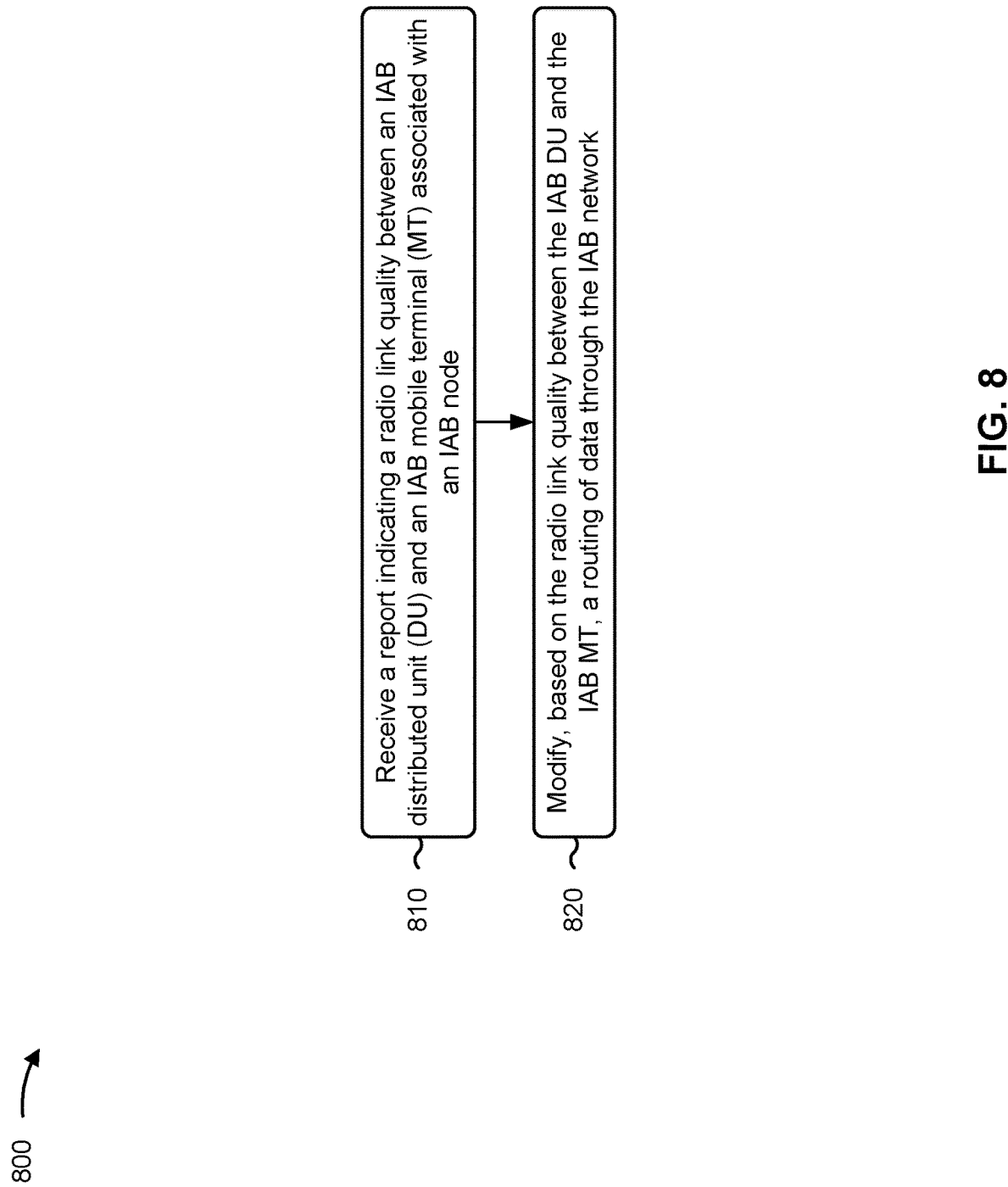

FIG. 8 is a diagram illustrating an example process 800 performed, for example, by an apparatus of a central or management entity of an IAB network, in accordance with the present disclosure. Example process 800 is an example where the apparatus of the central or management entity (e.g., NGC 505, IAB donor 510, and/or IAB parent node 515) performs operations associated with IAB data collection.

As shown in FIG. 8, in some aspects, process 800 may include receiving a report indicating a radio link quality between an IAB DU and an IAB MT associated with an IAB node (block 810). For example, the central or management entity (e.g., using communication manager 140 and/or reception component 1202, depicted in FIG. 12) may receive a report indicating a radio link quality between an IAB DU and an IAB MT associated with an IAB node, as described above.

As further shown in FIG. 8, in some aspects, process 800 may include modifying, based on the radio link quality between the IAB DU and the IAB MT, a routing of data through the IAB network (block 820). For example, the central or management entity (e.g., using communication manager 140 and/or modification component 1208, depicted in FIG. 12) may modify, based on the radio link quality between the IAB DU and the IAB MT, a routing of data through the IAB network, as described above.

Process 800 may include additional aspects, such as any single aspect or any combination of aspects described below and/or in connection with one or more other processes described elsewhere herein.

In a first aspect, the routing of data through the IAB network is modified further based at least in part on an additional metric indicated in the report, and wherein the additional metric includes one or more of loading information associated with the IAB node, a quantity of active UEs associated with the IAB node, a quantity of inactive UEs associated with the IAB node, or a quantity of IAB nodes attached to the IAB DU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
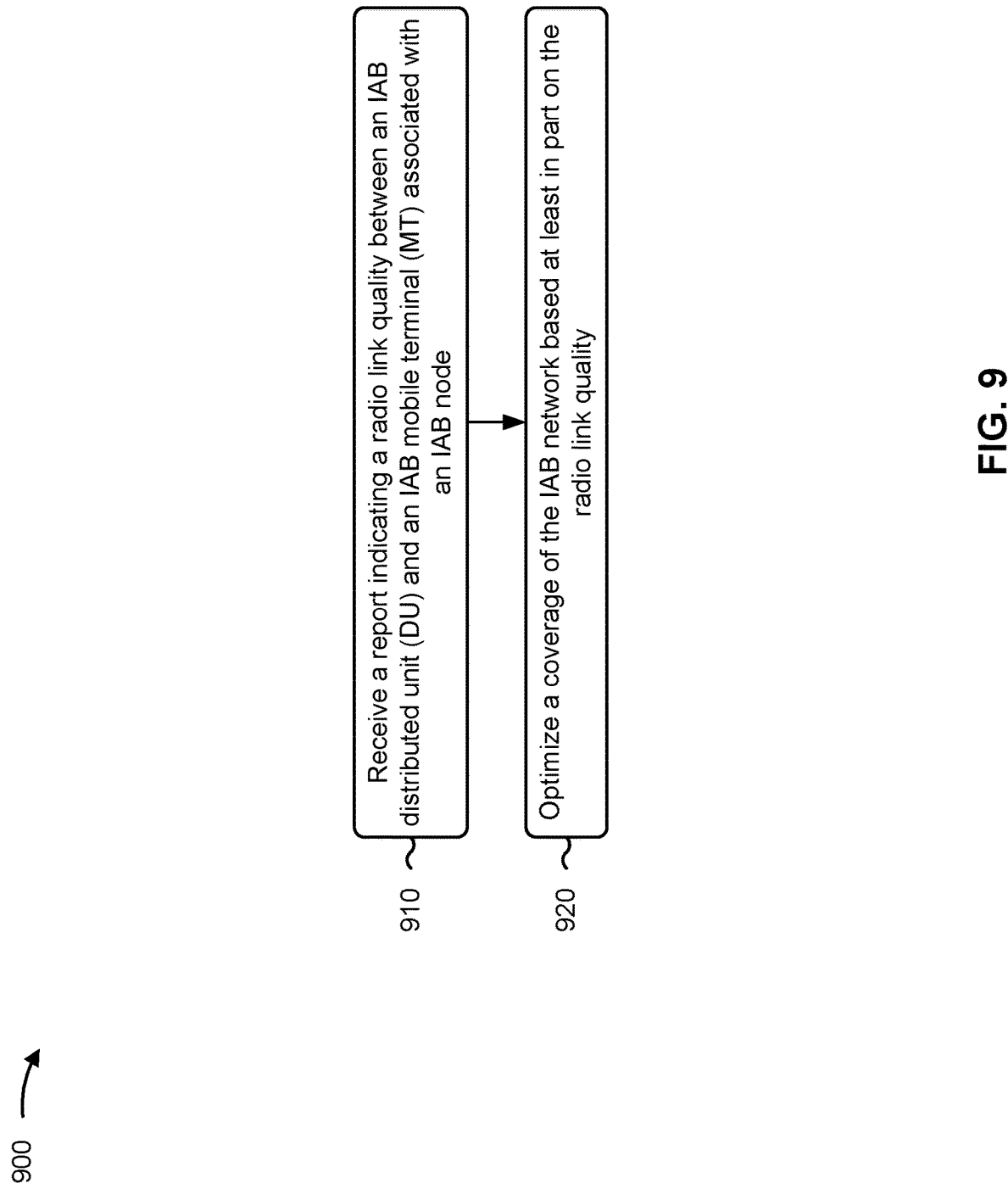

FIG. 9 is a diagram illustrating an example process 900 performed, for example, by an apparatus of a central or management entity of an IAB network, in accordance with the present disclosure. Example process 900 is an example where the apparatus of the central or management entity (e.g., NGC 505, IAB donor 510, and/or IAB parent node 515) performs operations associated with IAB data collection.

As shown in FIG. 9, in some aspects, process 900 may include receiving a report indicating a radio link quality between an IAB DU and an IAB MT associated with an IAB node (block 910). For example, the central or management entity (e.g., using communication manager 140 and/or reception component 1302, depicted in FIG. 13) may receive a report indicating a radio link quality between an IAB DU and an IAB MT associated with an IAB node, as described above.

As further shown in FIG. 9, in some aspects, process 900 may include optimizing a coverage of the IAB network based at least in part on the radio link quality (block 920). For example, the central or management entity (e.g., using communication manager 140 and/or optimization component 1308, depicted in FIG. 13) may optimize a coverage of the IAB network based at least in part on the radio link quality, as described above.

Process 900 may include additional aspects, such as any single aspect or any combination of aspects described below and/or in connection with one or more other processes described elsewhere herein.

In a first aspect, process 900 includes optimizing a capacity of the IAB network based at least in part on the radio link quality.

In a second aspect, alone or in combination with the first aspect, process 900 includes minimizing interference within the IAB network based at least in part on the radio link quality.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
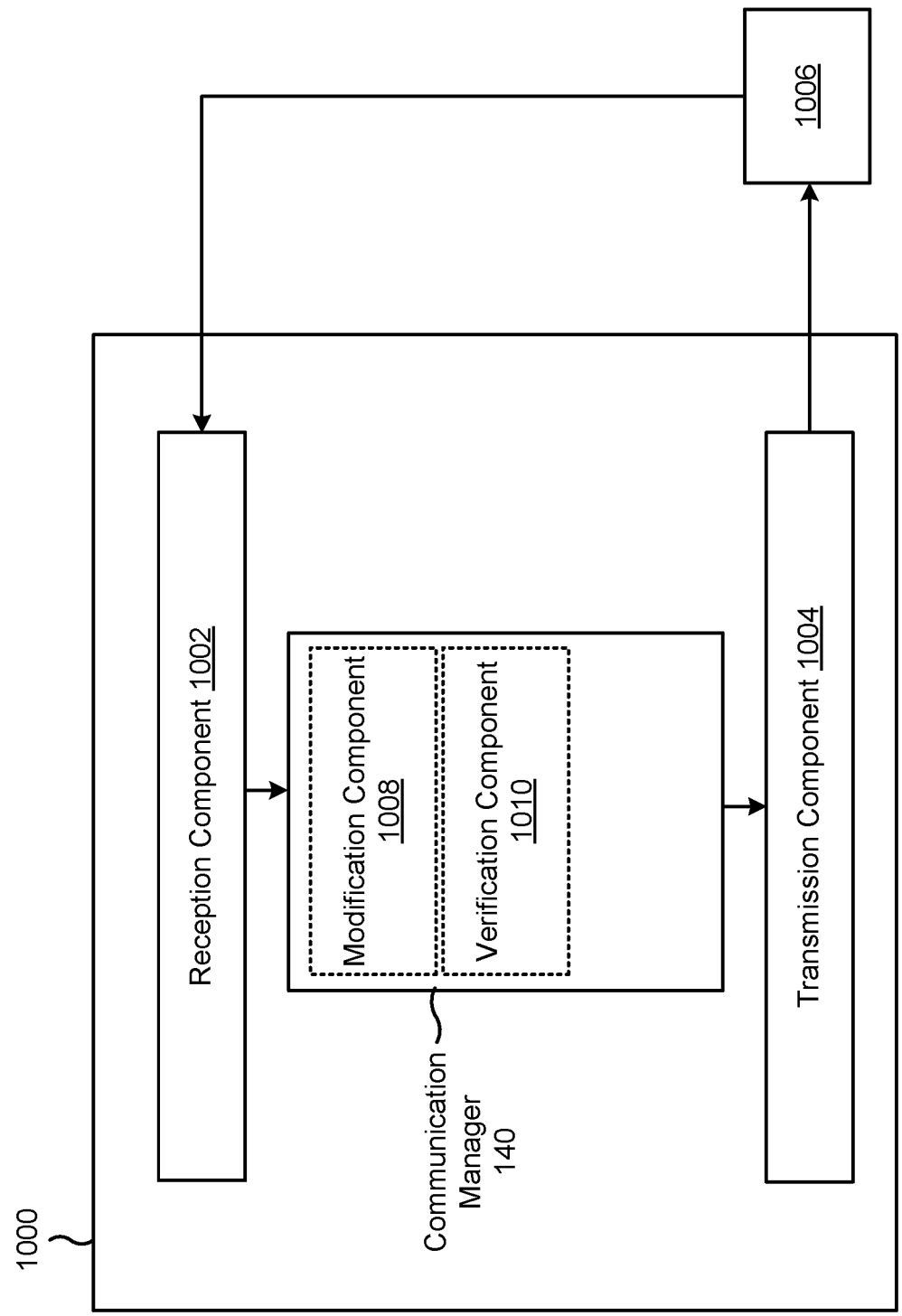
FIGS. 10-13 are diagrams of example apparatuses for wireless communication, in accordance with the present disclosure.

FIG. 10 is a diagram of an example apparatus 1000 for wireless communication. The apparatus 1000 may be a management or central entity of an IAB network (e.g., NGC 505, IAB donor 510, and/or IAB parent node 515), or a management or central entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a modification component 1008, or a verification component 1010, among other examples.

In some aspects, the apparatus 1000 may be configured to perform one or more operations described herein in connection with FIG. 5. Additionally, or alternatively, the apparatus 1000 may be configured to perform one or more processes described herein, such as process 600 of FIG. 6. In some aspects, the apparatus 1000 and/or one or more components shown in FIG. 10 may include one or more components of the management or central entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the management or central entity described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the management or central entity described in connection with FIG. 2. In some aspects, the transmission component 1004 may be co-located with the reception component 1002 in a transceiver.

The reception component 1002 may receive a report indicating one or more of a failure associated with a communication link associated with an IAB node included in the IAB network or a QoS associated with the communication link. The modification component 1008 may modify a topography of the IAB network or routing within the IAB network when the report indicates the failure associated with the communication link. The verification component 1010 may verify a QoS associated with the communication link when the report indicates the QoS associated with the communication link.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
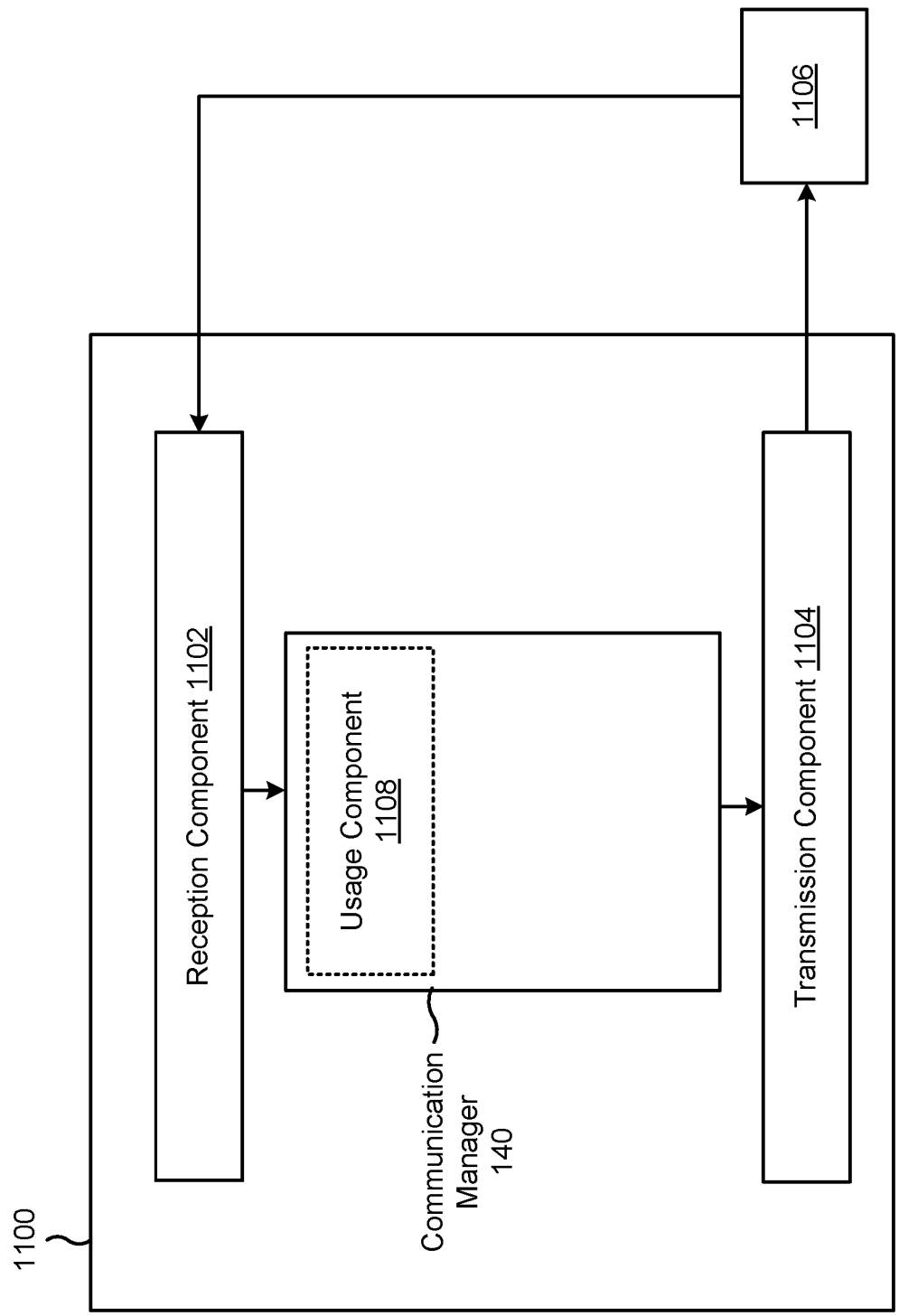

FIG. 11 is a diagram of an example apparatus 1100 for wireless communication. The apparatus 1100 may be a central or management entity of an IAB network (e.g., NGC 505, IAB donor 510, and/or IAB parent node 515), or a central or management entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a usage component 1108, among other examples.

In some aspects, the apparatus 1100 may be configured to perform one or more operations described herein in connection with FIG. 5. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the central or management entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the central or management entity described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the central or management entity described in connection with FIG. 2. In some aspects, the transmission component 1104 may be co-located with the reception component 1102 in a transceiver.

The reception component 1102 may receive a report indicating a radio link quality between an IAB DU and an IAB MT associated with an IAB node. The usage component 1108 may cause, based on the radio link quality between the IAB DU and the IAB MT, the IAB node to transition from an active state to an inactive state or the IAB node to transition from the inactive state to the active state based at least in part on the radio link quality.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
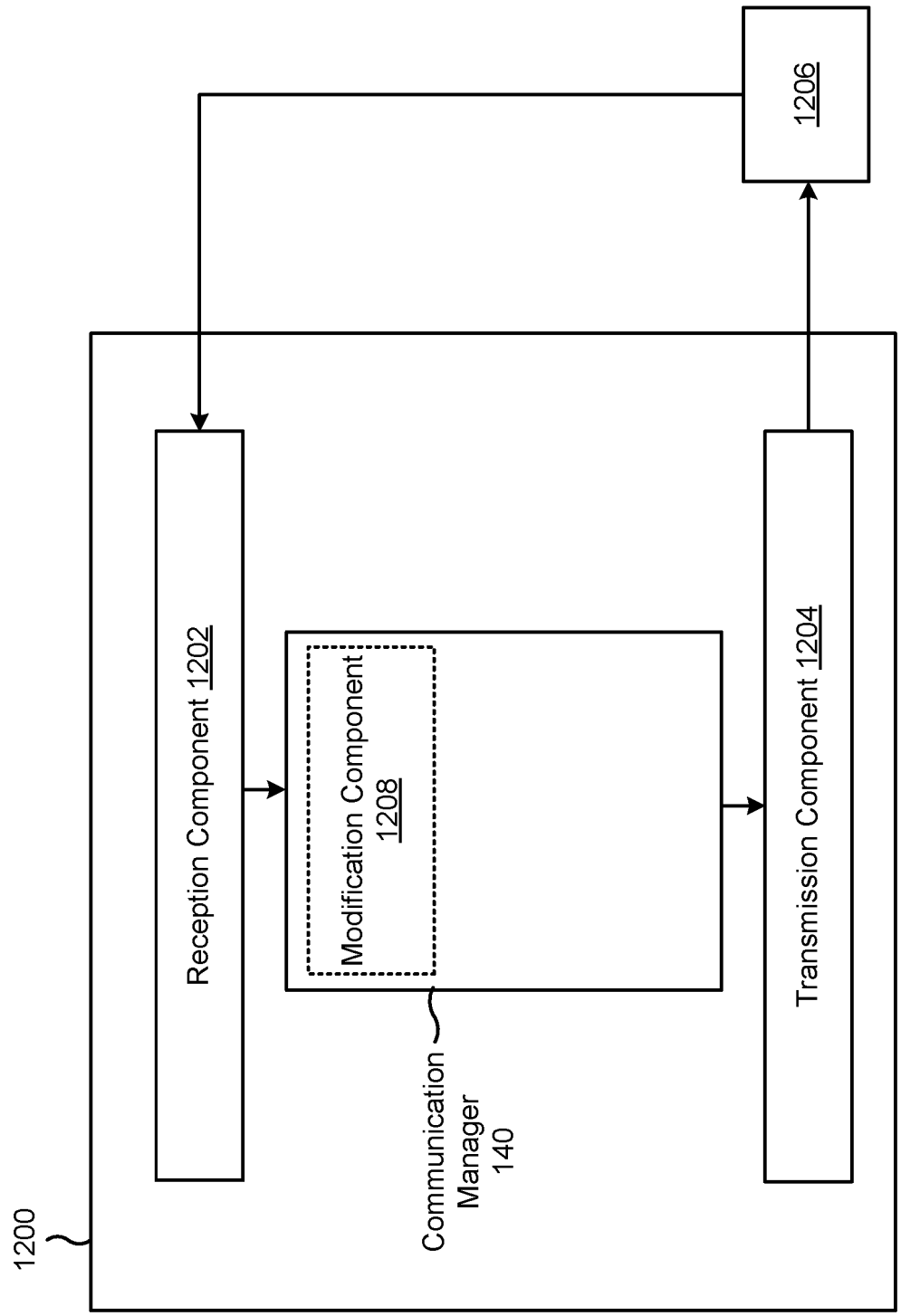

FIG. 12 is a diagram of an example apparatus 1200 for wireless communication. The apparatus 1200 may be a central or management entity of an IAB network (e.g., NGC 505, IAB donor 510, and/or IAB parent node 515), or a central or management entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a modification component 1208, among other examples.

In some aspects, the apparatus 1200 may be configured to perform one or more operations described herein in connection with FIG. 5. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the central or management entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the central or management entity described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the central or management entity described in connection with FIG. 2. In some aspects, the transmission component 1204 may be co-located with the reception component 1202 in a transceiver.

The reception component 1202 may receive a report indicating a radio link quality between an IAB DU and an IAB MT associated with an IAB node. The modification component 1208 may modify, based on the radio link quality between the IAB DU and the IAB MT, a routing of data through the IAB network.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
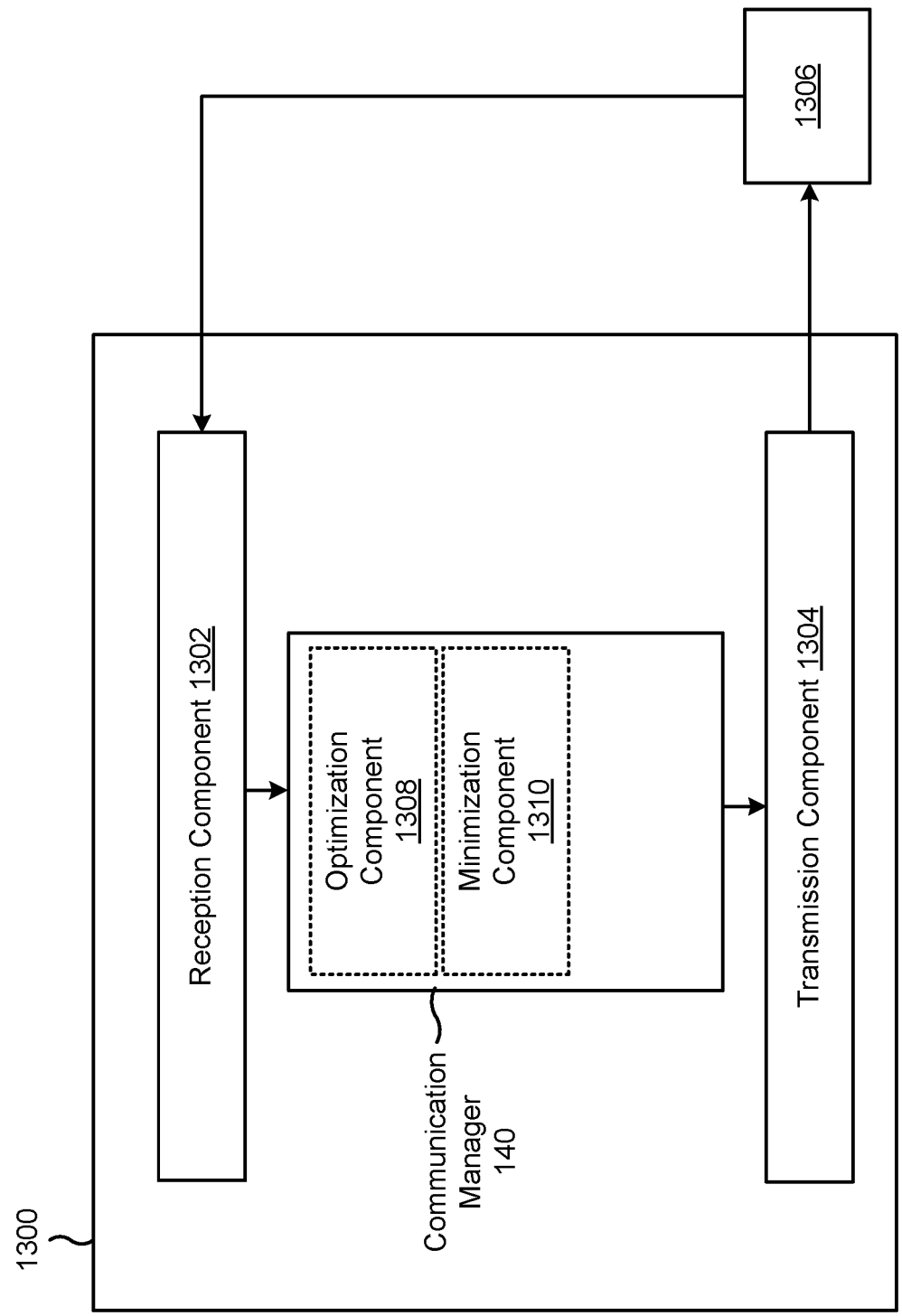

FIG. 13 is a diagram of an example apparatus 1300 for wireless communication. The apparatus 1300 may be a central or management entity of an IAB network (e.g., NGC 505, IAB donor 510, and/or IAB parent node 515), or a central or management entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include an optimization component 1308, among other examples.

In some aspects, the apparatus 1300 may be configured to perform one or more operations described herein in connection with FIG. 5. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the central or management entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the central or management entity described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the central or management entity described in connection with FIG. 2. In some aspects, the transmission component 1304 may be co-located with the reception component 1302 in a transceiver.

The reception component 1302 may receive a report indicating a radio link quality between an IAB DU and an IAB MT associated with an IAB node. The optimization component 1308 may optimize a coverage of the IAB network based at least in part on the radio link quality.

The optimization component 1308 may optimize a capacity of the IAB network based at least in part on the radio link quality.

The minimization component 1310 may minimize interference within the IAB network based at least in part on the radio link quality.

The minimization component 1310 may minimize interference within the IAB network based at least in part on the additional information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by an apparatus of a central or management entity of an IAB network, comprising: receiving a report indicating one or more of a failure associated with a communication link associated with an IAB node included in the IAB network or a QoS associated with the communication link; modifying a topography of the IAB network or routing within the IAB network when the report indicates the failure associated with the communication link; and verifying a QoS associated with the communication link when the report indicates the QoS associated with the communication link.

Aspect 2: The method of Aspect 1, wherein the report includes one or more of: an RLF report indicating an RLF between an IAB DU and an IAB MT, cell group failure information indicating a radio issue between a secondary IAB DU and a secondary IAB MT, an RA report indicating a status of an RA procedure between the IAB DU and the IAB MT, or a connection establishment failure report indicating one or more connection establishment failure attempts by the IAB MT.

Aspect 3: The method of one or more of Aspects 1 and 2, wherein the report includes one or more of: an indication of a volume of data associated with the TAB node, an indication of a UE downlink throughput associated with the IAB node, an indication of a UE uplink throughput associated with the IAB node, an indication of a RAN downlink delay associated with the IAB node, an indication of a RAN uplink delay associated with the IAB node, or an indication of a packet loss rate associated with the IAB node.

Aspect 4: The method of one or more of Aspects 1 through 3, wherein the report indicates an amount of congestion associated with a BAP routing identifier.

Aspect 5: The method of one or more of Aspects 1 through 4, wherein the report includes one or more of an indication that the report is associated with an IAB MT of the IAB network, a RACH parameter associated with the IAB node, or UE history information that is collected by the IAB node.

Aspect 6: The method of one or more of Aspects 1 through 5, wherein verifying the QoS associated with the communication link with the report indicates the QoS associated with the communication link includes verifying the QoS associated with the communication link based at least in part on one or more of an end-to-end delay associated with a BAP identifier of the IAB node, a hop-by-hop delay associated with the BAP routing identifier, or a quantity of hops associated with the BAP routing identifier.

Aspect 7: The method of one or more of Aspects 1 through 6, wherein modifying the topography of the IAB network or the routing within the IAB network when the report indicates the failure associated with the communication link includes transmitting an indication to the IAB node based at least in part on the report indicating the failure associated with the communication link, wherein the IAB node transitions from an active state to an inactive state based at least in part on the indication.

Aspect 8: The method of one or more of Aspects 1 through 7, wherein the report includes an RA report associated with an IAB MT, and wherein the RA report indicates one or more of: that the RA report is associated with the IAB MT, a PRACH configuration period associated with the IAB node, or a PRACH configuration offset associated with the IAB node.

Aspect 9: The method of one or more of Aspects 1 through 8, wherein the report indicates one or more of: whether a RACH is received on a non-available resource, a quantity of occurrences of the RACH being received on the non-available resource, a quantity of occurrences of the RACH being received on a soft resource, or a quantity of occurrence of the RACH being received on a hard resource.

Aspect 10: The method of one or more of Aspects 1 through 9, wherein the report includes one or more of: an LBT failure status report associated with an IAB MT, or an LBT failure status report associated with a UE.

Aspect 11: The method of one or more of Aspects 1 through 10, wherein the report includes one or more first metrics associated with an access communication link of the IAB node and one or more second metrics associated with an IAB backhaul communication link of the IAB node, and wherein the QoS is verified based at least in part on one or more of the one or more first metrics or the one or more second metrics.

Aspect 12: The method of Aspect 11, wherein the one or more first metrics include one or more of: a volume of data associated with the access communication link, a UE downlink throughput associated with the access communication link, a UE uplink throughput associated with the access communication link, a RAN uplink delay associated with the access communication link, a RAN downlink delay associated with the access communication link, or a packet loss rate associated with the access communication link.

Aspect 13: The method of Aspect 11, wherein the one or more second metrics include one or more of: a volume of data associated with the IAB backhaul communication link, a UE downlink throughput associated with the IAB backhaul communication link, a UE uplink throughput associated with the IAB backhaul communication link, a RAN uplink delay associated with the IAB backhaul communication link, a RAN downlink delay associated with the IAB backhaul communication link, or a packet loss rate associated with the IAB backhaul communication link.

Aspect 14: The method of Aspect 11, wherein the IAB node obtains the one or more first metrics based at least in part on a first packet transmitted over the access communication link, and wherein the IAB node obtains the one or more second metrics based at least in part on a second packet transmitted over the IAB communication link.

Aspect 15: The method of Aspect 14, wherein the IAB node obtains the one or more first metrics separate from the one or more second metrics.

Aspect 16: The method of one or more of Aspects 1 through 15, wherein the report indicates one or more of: cell identity information associated with the IAB node, a BAP routing identifier associated with the IAB node, or an IAB RLC logical channel associated with the IAB node.

Aspect 17: The method of one or more of Aspects 1 through 16, wherein the report indicates one or more of: a quantity of IAB MT nodes connected to the IAB node, or a quantity of UEs connected to the IAB node.

Aspect 18: The method of one or more of Aspects 1 through 17, wherein the report indicates one or more of: a metric associated with a 2-step RACH procedure performed by the IAB node, a metric associated with a 4-step RACH procedure performed by the IAB node, a metric associated with a CBRA procedure performed by the IAB node, or a metric associated with a CFRA procedure performed by the IAB node.

Aspect 19: The method of one or more of Aspects 1 through 18, wherein the report indicates one or more of: a power headroom measure associated with the IAB node, a quantity of intra-CU-CP handover procedures performed by the IAB node, a quantity of inter-CU-CP handover procedures performed by the IAB node, a quantity of interruptions occurring during the intra-CU-CP handover procedures, a quantity of interruptions occurring during the inter-CU-CP handover procedures, or a quantity of interruptions occurring during topology adaptation procedures.

Aspect 20: The method of one or more of Aspects 1 through 19, wherein the report indicates a quantity of re-routed packets associated with an uplink communication channel and a quantity of re-routed packets associated with a downlink communication channel based at least in part on detecting an RLF at an IAB MT of the IAB node.

Aspect 21: The method of one or more of Aspects 1 through 20, wherein the report indicates a parameter associated with a load experienced by the IAB node.

Aspect 22: A method of wireless communication performed by an apparatus of a central or management entity of an IAB network, comprising: receiving a report indicating a radio link quality between an IAB DU and an IAB MT associated with an IAB node; and causing, based on the radio link quality between the IAB DU and the IAB MT, the IAB node to transition from an active state to an inactive state or the IAB node to transition from the inactive state to the active state based at least in part on the radio link quality.

Aspect 23: The method of Aspect 22, wherein the IAB node is caused to transition from the active state to the inactive state or to transition from the inactive state to the active state further based at least in part on an additional metric indicated in the report, and wherein the additional metric includes one or more of: load information associated with the IAB node, a quantity of active UEs associated with the IAB node, a quantity of inactive UEs associated with the IAB node, or a quantity of IAB nodes attached to the IAB DU.

Aspect 24: A method of wireless communication performed by an apparatus of a central or management entity of an IAB network, comprising: receiving a report indicating a radio link quality between an IAB DU and an IAB MT associated with an IAB node; and modifying, based on the radio link quality between the IAB DU and the IAB MT, a routing of data through the IAB network.

Aspect 25: The method of Aspect 24, wherein the routing of data through the IAB network is modified further based at least in part on an additional metric indicated in the report, and wherein the additional metric includes one or more of: load information associated with the IAB node, a quantity of active UEs associated with the IAB node, a quantity of inactive UEs associated with the IAB node, or a quantity of IAB nodes attached to the IAB DU.

Aspect 26: A method of wireless communication performed by an apparatus of a central or management entity of an IAB network, comprising: receiving a report indicating a radio link quality between an IAB DU and an IAB MT associated with an IAB node; and optimizing a coverage of the IAB network based at least in part on the radio link quality.

Aspect 27: The method of Aspect 26, further comprising: optimizing a capacity of the IAB network based at least in part on the radio link quality.

Aspect 28: The method of one or more of Aspects 26 and 27, further comprising: minimizing interference within the IAB network based at least in part on the radio link quality.

Aspect 29: The method of one or more of Aspects 26 through 28, wherein the report includes additional information indicating one or more of: an IAB DU resource configuration, an IAB DU cell specific signal allocation, an IAB donor node associated with the IAB node, an IAB parent node associated with the IAB node, or a location of the IAB node, and wherein the method further comprises one or more of: optimizing the coverage of the IAB network further based at least in part on the additional information, or optimizing a capacity of the IAB network based at least in part on the additional information.

Aspect 30: The method of Aspect 29, further comprising: minimizing interference within the IAB network based at least in part on the additional information.

Aspect 31: An apparatus for wireless communication at a device, comprising a processor; memory coupled with the processor; and instructions stored in the memory and executable by the processor to cause the apparatus to perform the method of one or more of Aspects 1 through 21.

Aspect 32: A device for wireless communication, comprising a memory and one or more processors coupled to the memory, the one or more processors configured to perform the method of one or more of Aspects 1 through 21.

Aspect 33: An apparatus for wireless communication, comprising at least one means for performing the method of one or more of Aspects 1 through 21.

Aspect 34: A non-transitory computer-readable medium storing code for wireless communication, the code comprising instructions executable by a processor to perform the method of one or more of Aspects 1 through 21.

Aspect 35: A non-transitory computer-readable medium storing a set of instructions for wireless communication, the set of instructions comprising one or more instructions that, when executed by one or more processors of a device, cause the device to perform the method of one or more of Aspects 1 through 21.

Aspect 36: An apparatus for wireless communication at a device, comprising a processor; memory coupled with the processor; and instructions stored in the memory and executable by the processor to cause the apparatus to perform the method of one or more of Aspects 22 and 23.

Aspect 37: A device for wireless communication, comprising a memory and one or more processors coupled to the memory, the one or more processors configured to perform the method of one or more of Aspects 22 and 23.

Aspect 38: An apparatus for wireless communication, comprising at least one means for performing the method of one or more of Aspects 1 through 21.

Aspect 39: A non-transitory computer-readable medium storing code for wireless communication, the code comprising instructions executable by a processor to perform the method of one or more of Aspects 22 and 23.

Aspect 40: A non-transitory computer-readable medium storing a set of instructions for wireless communication, the set of instructions comprising one or more instructions that, when executed by one or more processors of a device, cause the device to perform the method of one or more of Aspects 22 and 23.

Aspect 41: An apparatus for wireless communication at a device, comprising a processor; memory coupled with the processor; and instructions stored in the memory and executable by the processor to cause the apparatus to perform the method of one or more of Aspects 24 and 25.

Aspect 42: A device for wireless communication, comprising a memory and one or more processors coupled to the memory, the one or more processors configured to perform the method of one or more of Aspects 24 and 25.

Aspect 43: An apparatus for wireless communication, comprising at least one means for performing the method of one or more of Aspects 24 and 25.

Aspect 44: A non-transitory computer-readable medium storing code for wireless communication, the code comprising instructions executable by a processor to perform the method of one or more of Aspects 24 and 25.

Aspect 45: A non-transitory computer-readable medium storing a set of instructions for wireless communication, the set of instructions comprising one or more instructions that, when executed by one or more processors of a device, cause the device to perform the method of one or more of Aspects 24 and 25.

Aspect 46: An apparatus for wireless communication at a device, comprising a processor; memory coupled with the processor; and instructions stored in the memory and executable by the processor to cause the apparatus to perform the method of one or more of Aspects 26 through 30.

Aspect 47: A device for wireless communication, comprising a memory and one or more processors coupled to the memory, the one or more processors configured to perform the method of one or more of Aspects 26 through 30.

Aspect 48: An apparatus for wireless communication, comprising at least one means for performing the method of one or more of Aspects 26 through 30.

Aspect 49: A non-transitory computer-readable medium storing code for wireless communication, the code comprising instructions executable by a processor to perform the method of one or more of Aspects 26 through 30.

Aspect 50: A non-transitory computer-readable medium storing a set of instructions for wireless communication, the set of instructions comprising one or more instructions that, when executed by one or more processors of a device, cause the device to perform the method of one or more of Aspects 26 through 30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a central or management entity of an integrated access and backhaul (IAB) network, comprising:
a memory; and
one or more processors coupled to the memory, wherein the one or more processors are configured to:
receive a report indicating one or more of a failure associated with a communication link associated with an IAB node included in the IAB network or a quality of service (QoS) associated with the communication link, wherein the report includes one or more of:
an indication of a volume of data associated with the IAB node,
an indication of a user equipment (UE) downlink throughput associated with the IAB node,
an indication of a UE uplink throughput associated with the IAB node,
an indication of a radio access network (RAN) downlink delay associated with the IAB node,
an indication of a RAN uplink delay associated with the IAB node,
an indication of a packet loss rate associated with the IAB node,
an indication of an amount of congestion associated with a backhaul adaptation protocol (BAP) routing identifier of the IAB node,
a radio access (RA) report associated with an IAB mobile terminal (MT),
one or more first metrics associated with an access communication link of the IAB node and one or more second metrics associated with an IAB backhaul communication link of the IAB node,
an indication of a power headroom measure associated with the IAB node,
an indication of a quantity of intra-control unit (CU)-control plane (CP) handover procedures performed by the IAB node,
an indication of a quantity of inter-CU-CP handover procedures performed by the IAB node,
an indication of a quantity of interruptions occurring during intra-CU-CP handover procedures,
an indication of a quantity of interruptions occurring during inter-CU-CP handover procedures,
an indication of a quantity of interruptions occurring during topology adaptation procedures, or
an indication of a quantity of re-routed packets associated with an uplink communication channel and a quantity of re-routed packets associated with a downlink communication channel;
modify a topography of the IAB network or routing within the IAB network when the report indicates the failure associated with the communication link; and
verify a QoS associated with the communication link when the report indicates the QoS associated with the communication link, wherein:
when the report includes the indication of the amount of congestion associated with the BAP routing identifier of the IAB node, the QoS associated with the communication link is verified based at least in part on the amount of congestion associated with the BAP routing identifier;
when the report includes the one or more first metrics associated with the access communication link of the IAB node and the one or more second metrics associated with the IAB backhaul communication link of the IAB node, the QoS is verified based at least in part on one or more of the one or more first metrics or the one or more second metrics; or
when the report indicates the QoS associated with the communication link, the QoS associated with the communication link is verified based at least in part on one or more of:
an end-to-end delay associated with the BAP routing identifier of the IAB node,
a hop-by-hop delay associated with the BAP routing identifier, or
a quantity of hops associated with the BAP routing identifier.

2. The apparatus of claim 1, wherein the report includes one or more of:
a radio link failure (RLF) report indicating an RLF between an IAB distributed unit (DU) and the IAB MT,
cell group failure information indicating a radio issue between a secondary IAB DU and a secondary IAB MT,
an RA report indicating a status of an RA procedure between the IAB DU and the IAB MT, or
a connection establishment failure report indicating one or more connection establishment failure attempts by the IAB MT.

3. The apparatus of claim 1, wherein the report includes one or more of:
an indication that the report is associated with a second IAB MT of the IAB network,
a radio access channel (RACH) parameter associated with the IAB node, or UE history information that is collected by the IAB node.

4. The apparatus of claim 1, wherein the one or more processors, to modify the topography of the IAB network or the routing within the IAB network when the report indicates the failure associated with the communication link, are configured to:
transmit an indication to the IAB node to transition from an active state to an inactive state based at least in part on the report indicating the failure associated with the communication link.

5. The apparatus of claim 1, wherein the RA report indicates one or more of:
that the RA report is associated with the IAB MT,
a physical random access channel (PRACH) configuration period associated with the IAB node, or
a PRACH configuration offset associated with the IAB node.

6. The apparatus of claim 5, wherein the RA report indicates that the RA report is associated with the IAB MT.

7. The apparatus of claim 5, wherein the RA report indicates the PRACH configuration period associated with the IAB node.

8. The apparatus of claim 5, wherein the RA report indicates the PRACH configuration offset associated with the IAB node.

9. The apparatus of claim 1, wherein the report indicates one or more of:
whether a radio access channel (RACH) is received on a non-available resource,
a quantity of occurrences of the RACH being received on the non-available resource, a quantity of occurrences of the RACH being received on a soft resource, or a quantity of occurrences of the RACH being received on a hard resource.

10. The apparatus of claim 1, wherein the report includes one or more of:
a listen-before-talk (LBT) failure status report associated with the IAB MT, or
an LBT failure status report associated with a UE.

11. The apparatus of claim 1, wherein the one or more first metrics include one or more of:
a volume of data associated with the access communication link,
a UE downlink throughput associated with the access communication link,
a UE uplink throughput associated with the access communication link,
a RAN uplink delay associated with the access communication link,
a RAN downlink delay associated with the access communication link, or
a packet loss rate associated with the access communication link.

12. The apparatus of claim 1, wherein the one or more second metrics include one or more of:
a volume of data associated with the IAB backhaul communication link,
a UE downlink throughput associated with the IAB backhaul communication link,
a UE uplink throughput associated with the IAB backhaul communication link,
a RAN uplink delay associated with the IAB backhaul communication link,
a RAN downlink delay associated with the IAB backhaul communication link, or
a packet loss rate associated with the IAB backhaul communication link.

13. The apparatus of claim 1 wherein the IAB node obtains the one or more first metrics based at least in part on a first packet transmitted over the access communication link, and wherein the IAB node obtains the one or more second metrics based at least in part on a second packet transmitted over the IAB backhaul communication link.

14. The apparatus of claim 13, wherein the IAB node obtains the one or more first metrics separate from the one or more second metrics.

15. The apparatus of claim 1, wherein the report indicates one or more of:
cell identity information associated with the IAB node,
a backhaul adaptation protocol (BAP) routing identifier associated with the IAB node, or
an IAB radio link control (RLC) logical channel associated with the IAB node.

16. The apparatus of claim 1, wherein the report indicates one or more of:
a quantity of IAB MT nodes connected to the IAB node, or
a quantity of UEs connected to the IAB node.

17. The apparatus of claim 1, wherein the report indicates one or more of:
a metric associated with a 2-step random access channel (RACH) procedure performed by the IAB node,
a metric associated with a 4-step RACH procedure performed by the IAB node,
a metric associated with a contention-based RA (CBRA) procedure performed by the IAB node, or
a metric associated with a contention free RA (CFRA) procedure performed by the IAB node.

18. The apparatus of claim 1, wherein the report indicates the quantity of re-routed packets associated with the uplink communication channel and the quantity of re-routed packets associated with the downlink communication channel based at least in part on detecting a radio link failure (RLF) at an IAB MT of the IAB node.

19. The apparatus of claim 1, wherein the report indicates a parameter associated with a load experienced by the IAB node.

20. The apparatus of claim 1, wherein the report includes the indication of the volume of data associated with the IAB node.

21. The apparatus of claim 1, wherein the report includes the indication of the UE downlink throughput associated with the IAB node.

22. The apparatus of claim 1, wherein the report includes the indication of the UE uplink throughput associated with the IAB node.

23. The apparatus of claim 1, wherein the report includes the indication of the RAN downlink delay associated with the IAB node.

24. The apparatus of claim 1, wherein the report includes the indication of the RAN uplink delay associated with the IAB node.

25. The apparatus of claim 1, wherein the report includes the indication of the packet loss rate associated with the IAB node.

26. The apparatus of claim 1, wherein the report includes the indication of the amount of congestion associated with the BAP routing identifier of the IAB node.

27. The apparatus of claim 1, wherein the report includes the RA report associated with an IAB MT.

28. The apparatus of claim 1, wherein the report includes the one or more first metrics associated with the access communication link of the IAB node and the one or more second metrics associated with the IAB backhaul communication link of the IAB node.

29. The apparatus of claim 1, wherein the report includes the indication of the power headroom measure associated with the IAB node.

30. The apparatus of claim 1, wherein the report includes the indication of the quantity of intra-CU-CP handover procedures performed by the IAB node.

31. The apparatus of claim 1, wherein the report includes the indication of the quantity of inter-CU-CP handover procedures performed by the IAB node.

32. The apparatus of claim 1, wherein the report includes the indication of the quantity of interruptions occurring during the intra-CU-CP handover procedures.

33. The apparatus of claim 1, wherein the report includes the indication of the quantity of interruptions occurring during the inter-CU-CP handover procedures.

34. The apparatus of claim 1, wherein the report includes the indication of the quantity of interruptions occurring during topology adaptation procedures.

35. The apparatus of claim 1, wherein the report includes the indication of the quantity of re-routed packets associated with the uplink communication channel and the quantity of re-routed packets associated with the downlink communication channel.

36. An apparatus of a central or management entity of an integrated access and backhaul (IAB) network, comprising:
a memory; and
one or more processors coupled to the memory, wherein the one or more processors are configured to:

receive a report indicating a radio link quality between
an IAB distributed unit (DU) and an IAB mobile
terminal (MT) associated with an IAB node, wherein
the report includes one or more of:
  an indication of a volume of data associated with the
    IAB node,
  an indication of a user equipment (UE) downlink
    throughput associated with the IAB node,
  an indication of a UE uplink throughput associated
    with the IAB node,
  an indication of a radio access network (RAN)
    downlink delay associated with the IAB node,
  an indication of a RAN uplink delay associated with
    the IAB node,
  an indication of a packet loss rate associated with the
    IAB node,
  a radio access (RA) report associated with the IAB
    MT,
  an indication of a power headroom measure associated with the IAB node,
  an indication of a quantity of interruptions occurring
    during topology adaptation procedures, or
  an indication of a quantity of re-routed packets
    associated with an uplink communication channel
    and a quantity of re-routed packets associated with
    a downlink communication channel; and
cause, based on the radio link quality between the IAB
  DU and the IAB MT, the IAB node to transition from
  an active state to an inactive state or the IAB node to
  transition from the inactive state to the active state
  based at least in part on the radio link quality.

37. The apparatus of claim 36, wherein the IAB node is caused to transition from the active state to the inactive state or to transition from the inactive state to the active state further based at least in part on an additional metric indicated in the report, and wherein the additional metric includes one or more of:
  load information associated with the IAB node,
  a quantity of active UEs associated with the IAB node,
  a quantity of inactive UEs associated with the IAB node, or
  a quantity of IAB nodes attached to the IAB DU.

38. An apparatus of a central or management entity of an integrated access and backhaul (IAB) network, comprising:
  a memory; and
  one or more processors coupled to the memory, wherein the one or more processors are configured to:
    receive a report indicating a radio link quality between
      an IAB distributed unit (DU) and an IAB mobile
      terminal (MT) associated with an IAB node, wherein
      the report includes one or more of:
      an indication of a volume of data associated with the
        IAB node,
      an indication of a user equipment (UE) downlink
        throughput associated with the IAB node,
      an indication of a UE uplink throughput associated
        with the IAB node,
      an indication of a radio access network (RAN)
        downlink delay associated with the IAB node,
      an indication of a RAN uplink delay associated with
        the IAB node,
      an indication of a packet loss rate associated with the
        IAB node,
      a radio access (RA) report associated with the IAB
        MT,
      an indication of a power headroom measure associated with the IAB node,
      an indication of a quantity of interruptions occurring
        during topology adaptation procedures, or
      an indication of a quantity of re-routed packets
        associated with an uplink communication channel
        and a quantity of re-routed packets associated with
        a downlink communication channel; and
    modify, based on the radio link quality between the
      IAB DU and the IAB MT, a routing of data through
      the IAB network.

39. The apparatus of claim 38, wherein the routing of data through the IAB network is modified further based at least in part on an additional metric indicated in the report, and wherein the additional metric includes one or more of:
  load information associated with the IAB node,
  a quantity of active UEs associated with the IAB node,
  a quantity of inactive UEs associated with the IAB node, or
  a quantity of IAB nodes attached to the IAB DU.

40. An apparatus of a central or management entity of an integrated access and backhaul (IAB) network, comprising:
  a memory; and
  one or more processors, coupled to the memory, configured to:
    receive a report indicating a radio link quality between
      an IAB distributed unit (DU) and an IAB mobile
      terminal (MT) associated with an IAB node, wherein
      the report includes one or more of:
      an indication of a volume of data associated with the
        IAB node,
      an indication of a user equipment (UE) downlink
        throughput associated with the IAB node,
      an indication of a UE uplink throughput associated
        with the IAB node,
      an indication of a radio access network (RAN)
        downlink delay associated with the IAB node,
      an indication of a RAN uplink delay associated with
        the IAB node,
      an indication of a packet loss rate associated with the
        IAB node,
      a radio access (RA) report associated with the IAB
        MT,
      an indication of a power headroom measure associated with the IAB node,
      an indication of a quantity of interruptions occurring
        during topology adaptation procedures, or
      an indication of a quantity of re-routed packets
        associated with an uplink communication channel
        and a quantity of re-routed packets associated with
        a downlink communication channel; and
    modify a coverage of the IAB network based at least in
      part on the radio link quality.

41. The apparatus of claim 40, wherein the one or more processors are further configured to:
  modify a capacity of the IAB network based at least in part on the radio link quality.

42. The apparatus of claim 40, wherein the one or more processors are further configured to:
  minimize interference within the IAB network based at least in part on the radio link quality.

43. The apparatus of claim 40, wherein the report includes additional information indicating one or more of:
  an IAB DU resource configuration,
  an IAB DU cell specific signal allocation,
  an IAB donor node associated with the IAB node,
  an IAB parent node associated with the IAB node, or
  a location of the IAB node, and wherein the one or more processors are further configured to:
  modify the coverage of the IAB network further based at least in part on the additional information, or
  modify a capacity of the IAB network based at least in part on the additional information.

44. The apparatus of claim 43, wherein the one or more processors are further configured to:
  minimize interference within the IAB network based at least in part on the additional information.

* * * * *